(12) United States Patent
Gibson et al.

(10) Patent No.: US 9,327,728 B2
(45) Date of Patent: *May 3, 2016

(54) METHODS AND SYSTEMS FOR A VEHICLE DRIVELINE POWER TAKE OFF

(71) Applicant: Ford Global Technologies, LLC, Dearborn, MI (US)

(72) Inventors: Alex O'Connor Gibson, Ann Arbor, MI (US); Gregory Michael Pietron, Canton, MI (US); Yuji Fujii, Ann Arbor, MI (US); Jeffrey Allen Doering, Canton, MI (US); James William Loch McCallum, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,161

(22) Filed: Aug. 25, 2014

(65) Prior Publication Data

US 2015/0006011 A1 Jan. 1, 2015

Related U.S. Application Data

(63) Continuation of application No. 13/652,349, filed on Oct. 15, 2012, now Pat. No. 8,813,881.

(60) Provisional application No. 61/643,156, filed on May 4, 2012.

(51) Int. Cl.
*B60K 17/28* (2006.01)
*B60W 30/18* (2012.01)

(Continued)

(52) U.S. Cl.
CPC ............ *B60W 30/18018* (2013.01); *B60K 6/48* (2013.01); *B60K 17/28* (2013.01); *B60W 10/02*
(Continued)

(58) Field of Classification Search
CPC .......... B60K 1/04; B60K 17/28; B60K 25/06; B60K 2006/4825; B60W 10/02; B60W 10/06; B60W 10/30; B60W 10/023; B60W 10/08; B60W 20/00; B60W 30/02; Y10T 477/23; Y10T 477/26; Y10T 477/27; Y10T 477/75; Y02T 10/6252

See application file for complete search history.

(56) References Cited

U.S. PATENT DOCUMENTS

| 4,708,030 A | 11/1987 | Cordner |
| 6,599,214 B2 | 7/2003 | Swales |

(Continued)

FOREIGN PATENT DOCUMENTS

| EP | 1582737 A2 | 3/2005 |
| GB | 2468906 A1 | 9/2010 |

OTHER PUBLICATIONS

Anonymous, "Diesel Dual Mass Flywheels with Solenoid assisted, centrifugal Locking Toggles," IPCOM No. 000032846, Published Nov. 15, 2004, 3 pages.

(Continued)

*Primary Examiner* — Faye M Fleming
(74) *Attorney, Agent, or Firm* — David Kelley; Alleman Hall McCoy Russell & Tuttle LLP

(57) ABSTRACT

Systems and methods for improving operation of a power take off are presented. In one example, the power take off may be rotated in two different directions. The approaches may improve operation of a power take off device.

20 Claims, 13 Drawing Sheets

(51) Int. Cl.
  *B60W 10/02* (2006.01)
  *B60W 10/06* (2006.01)
  *B60K 6/48* (2007.10)
  *B60W 10/08* (2006.01)
  *B60W 10/30* (2006.01)
  *B60W 20/00* (2016.01)
  *B60W 10/26* (2006.01)
  *B60W 30/02* (2012.01)

(52) U.S. Cl.
  CPC ............... (2013.01); *B60W 10/023* (2013.01); *B60W 10/06* (2013.01); *B60W 10/08* (2013.01); *B60W 10/26* (2013.01); *B60W 10/30* (2013.01); *B60W 20/106* (2013.01); *B60W 20/13* (2016.01); *B60W 20/40* (2013.01); *B60W 30/02* (2013.01); *B60W 30/18045* (2013.01); *B60W 30/18063* (2013.01); *B60K 2006/4825* (2013.01); *Y02T 10/6221* (2013.01); *Y02T 10/6252* (2013.01); *Y02T 10/6286* (2013.01); *Y10S 477/90* (2013.01); *Y10S 903/93* (2013.01); *Y10T 477/20* (2015.01); *Y10T 477/23* (2015.01); *Y10T 477/24* (2015.01); *Y10T 477/26* (2015.01); *Y10T 477/27* (2015.01); *Y10T 477/71* (2015.01); *Y10T 477/73* (2015.01); *Y10T 477/75* (2015.01)

(56) References Cited

U.S. PATENT DOCUMENTS

| | | | |
|---|---|---|---|
| 6,821,223 | B2 | 11/2004 | Henry |
| 7,021,409 | B2 | 4/2006 | Tamor |
| 7,576,501 | B2 | 8/2009 | Okubo et al. |
| 8,036,815 | B2 | 10/2011 | Okumoto et al. |
| 8,152,682 | B2 | 4/2012 | Swales et al. |
| 8,808,140 | B2 | 8/2014 | Reed et al. |
| 8,813,881 | B2 * | 8/2014 | Gibson et al. ............. 180/53.1 |
| 8,818,600 | B2 | 8/2014 | Reed et al. |
| 2002/0111239 | A1 | 8/2002 | Swales |
| 2009/0312144 | A1 | 12/2009 | Allgaier et al. |
| 2010/0299053 | A1 | 11/2010 | Okumoto et al. |
| 2011/0056450 | A1 | 3/2011 | Notani |
| 2011/0137544 | A1 | 6/2011 | Kawazu et al. |
| 2011/0172901 | A1 | 7/2011 | Okumoto et al. |
| 2011/0308875 | A1 | 12/2011 | Marsh et al. |
| 2012/0083385 | A1 | 4/2012 | Smith et al. |
| 2012/0083952 | A1 | 4/2012 | Smith et al. |
| 2012/0115668 | A1 | 5/2012 | Justin |
| 2012/0238394 | A1 | 9/2012 | Valente et al. |
| 2013/0291830 | A1 | 11/2013 | Doering et al. |
| 2013/0296098 | A1 | 11/2013 | Gibson et al. |
| 2013/0296101 | A1 | 11/2013 | Doering et al. |
| 2013/0296102 | A1 | 11/2013 | Banker et al. |
| 2013/0296118 | A1 | 11/2013 | Pietron et al. |
| 2013/0296119 | A1 | 11/2013 | Reed et al. |
| 2013/0296121 | A1 | 11/2013 | Gibson et al. |
| 2013/0296122 | A1 | 11/2013 | Banker et al. |
| 2013/0296123 | A1 | 11/2013 | Doering et al. |
| 2013/0296124 | A1 | 11/2013 | Pietron et al. |
| 2013/0296125 | A1 | 11/2013 | Gibson et al. |
| 2013/0296126 | A1 | 11/2013 | Gibson et al. |
| 2013/0296130 | A1 | 11/2013 | Banker et al. |
| 2013/0296132 | A1 | 11/2013 | Doering et al. |
| 2013/0296136 | A1 | 11/2013 | Doering et al. |
| 2013/0297114 | A1 | 11/2013 | Doering et al. |
| 2013/0297115 | A1 | 11/2013 | Doering et al. |
| 2013/0297116 | A1 | 11/2013 | Reed et al. |
| 2013/0297117 | A1 | 11/2013 | Lee et al. |
| 2013/0297118 | A1 | 11/2013 | Reed et al. |
| 2013/0297120 | A1 | 11/2013 | Reed et al. |
| 2013/0297121 | A1 | 11/2013 | Reed et al. |
| 2013/0297122 | A1 | 11/2013 | Gibson et al. |
| 2013/0297123 | A1 | 11/2013 | Gibson et al. |
| 2013/0297157 | A1 | 11/2013 | Pietron et al. |
| 2013/0297161 | A1 | 11/2013 | Gibson et al. |
| 2013/0297187 | A1 | 11/2013 | Doering et al. |
| 2013/0297191 | A1 | 11/2013 | Gibson et al. |

OTHER PUBLICATIONS

Anonymous, "Method of Detecting Engine Combustion Degradation in a HEV," IPCOM No. 000064093, Published Feb. 18, 2005, 2 pages.
Anonymous, "Dual Clutch Powershift Life Analysis Process," IPCOM No. 000143581, Published Nov. 29, 2006, 3 pages.
Anonymous, "Intermediate Torque Transfer in 4-Element Power-On Downshift," IPCOM No. 000239992, Published Dec. 19, 2014, 2 pages.

* cited by examiner

METHODS AND SYSTEMS FOR A VEHICLE DRIVELINE POWER TAKE OFF

CROSS REFERENCE TO RELATED APPLICATIONS

The present application is a continuation of U.S. patent application Ser. No. 13/652,349, "METHODS AND SYSTEMS FOR A VEHICLE DRIVELINE POWER TAKE OFF," filed Oct. 15, 2012, which claims priority to U.S. Provisional Patent Application No. 61/643,156, "METHODS AND SYSTEMS FOR A VEHICLE DRIVELINE," filed May 4, 2012, the entire contents of each of which are hereby incorporated by reference for all purposes.

FIELD

The present description relates to a system and methods for improving power take off operation of a vehicle. The methods may be particularly useful for engines that are selectively coupled to an electrical machine and a transmission.

BACKGROUND AND SUMMARY

Power from an engine is typically delivered to vehicle wheels to propel a vehicle. Additionally, engine power may be used to drive ancillary vehicle accessories such air conditioning and alternators. However, some vehicles include a power take off port located in the vehicle driveline between the engine and the wheels. The power take off can be a source of power to a device that is external to the vehicle or to a device that may not be incorporated into a typical passenger vehicle. For example, a power take off port may power a hydraulic pump that lifts a snow plow or a hydraulic motor that turns a cement mixer. However, typical power take off ports are limited to rotating in a single direction. Further, wheel torque provided to a driveline may be reduced when some power take off (PTO) devices are engaged.

The inventors herein have recognized the above-mentioned disadvantages and have developed a method of operating a PTO, comprising: rotating a PTO output via rotating a PTO power source in a first direction; and reversing rotation of the PTO output via rotating the PTO power source in a second direction different than the first direction, the PTO power source positioned in a vehicle driveline.

By providing power to a PTO output via a driveline integrated starter generator it may be possible to provide a reversing PTO output and a wheel torque that follows a desired wheel torque even in the presence of a PTO load. For example, by decoupling a DISG from an engine via a driveline disconnect clutch, it is possible to provide forward and reverse PTO output rotation. Additionally, when a driving clutch positioned between the DISG and the engine is closed, it may be possible to provide additional torque to a vehicle driveline while the PTO is being operated so that the actual wheel torque matches a desired wheel torque.

The present description may provide several advantages. Specifically, the approach may improve PTO functionality. Further, the approach may improve vehicle drivability during PTO operation. Further still, the approach may improve PTO operation communications to an operator.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
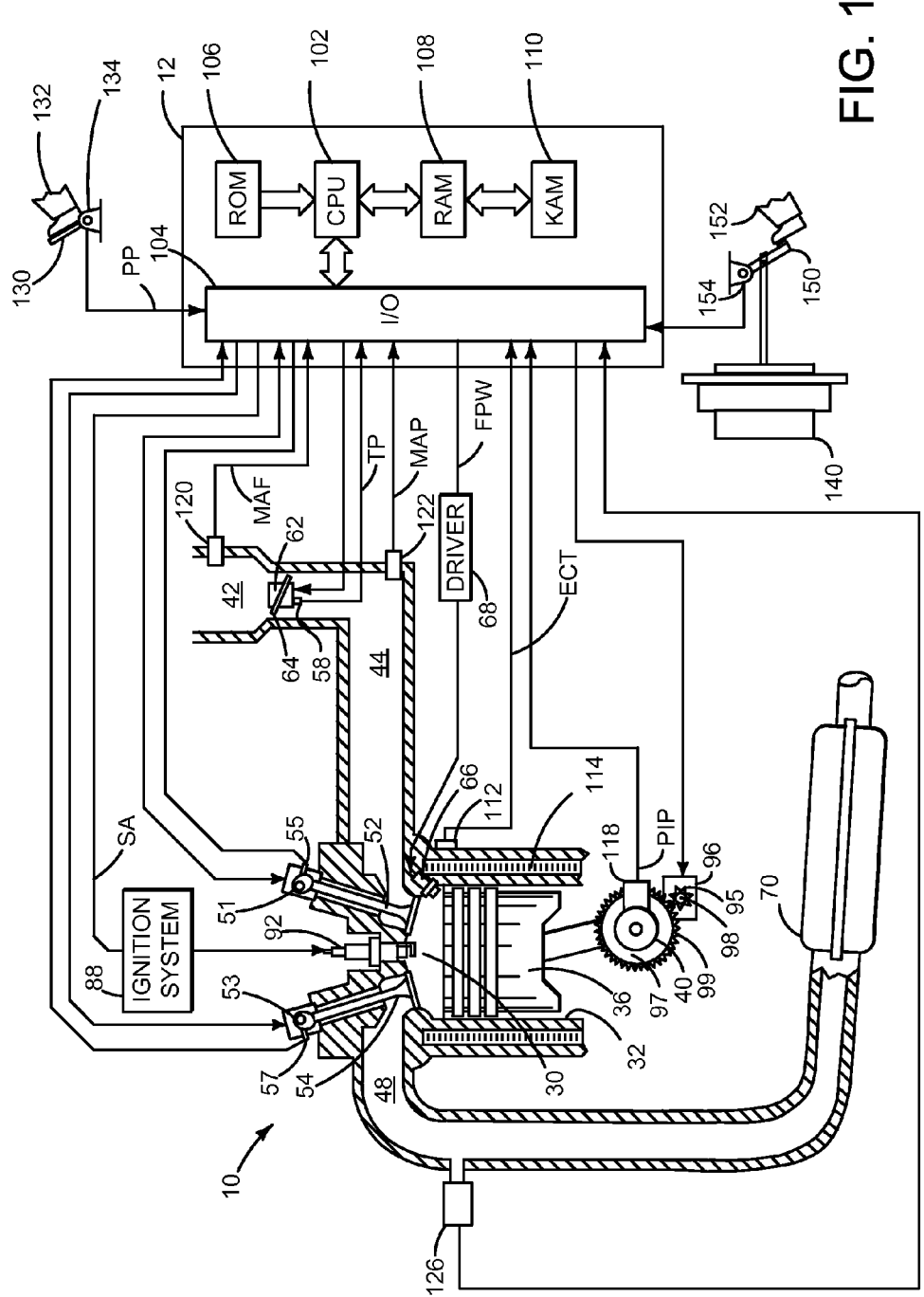
FIG. 1 is a schematic diagram of an engine.
Figure 2:
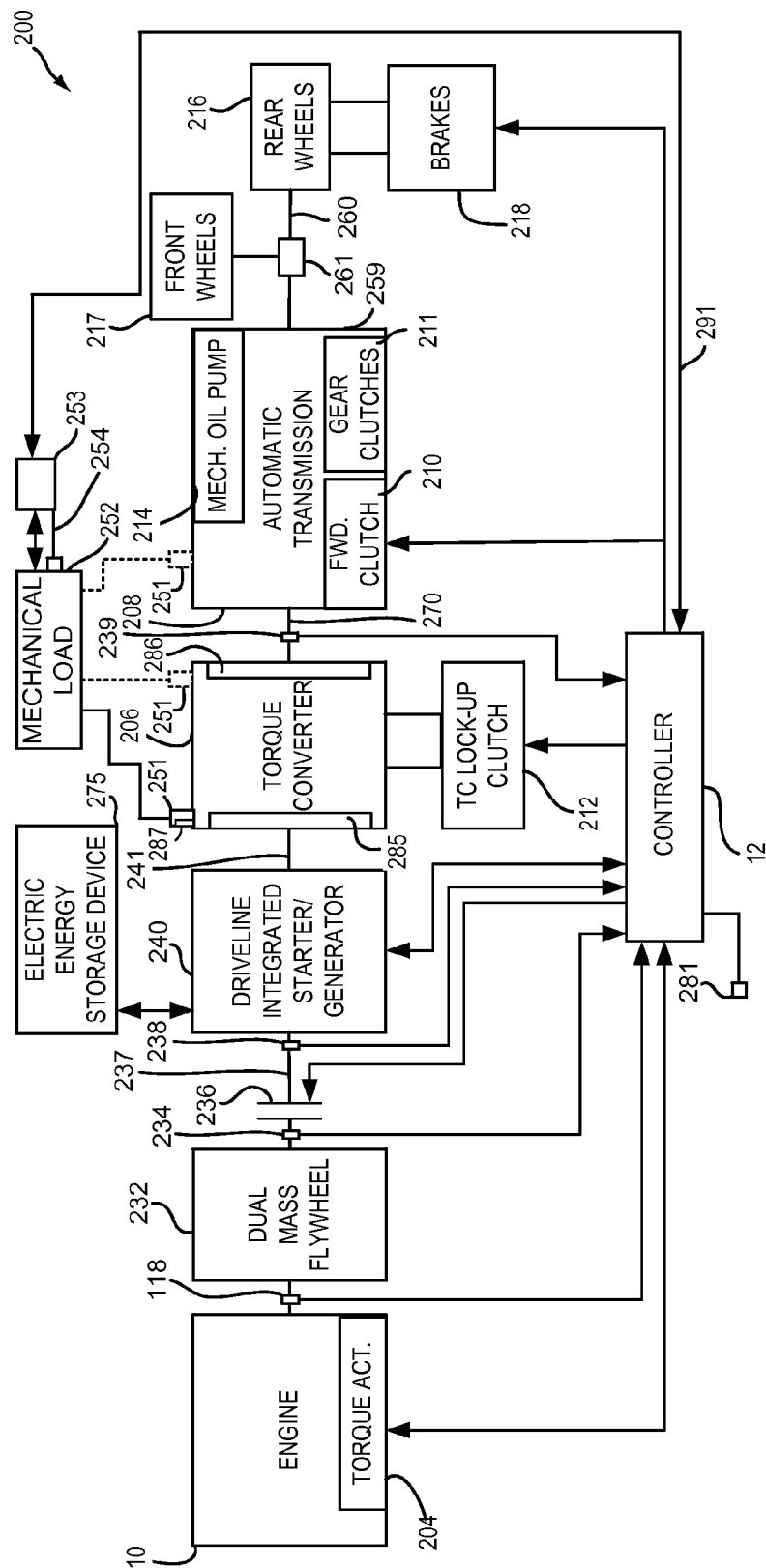
FIG. 2 is shows a first example vehicle driveline configuration.
Figure 3:
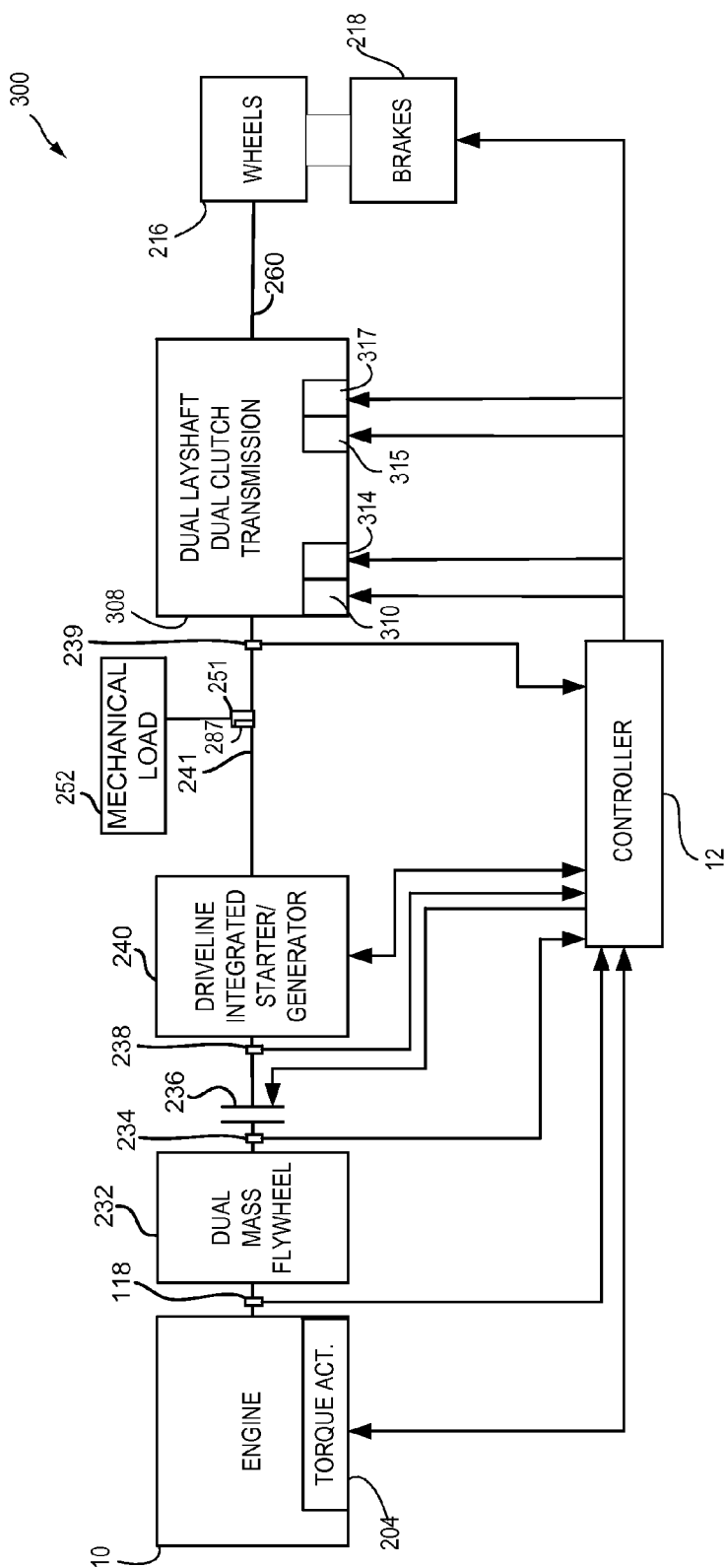
FIG. 3 is shows a second example vehicle driveline configuration.
Figure 11:
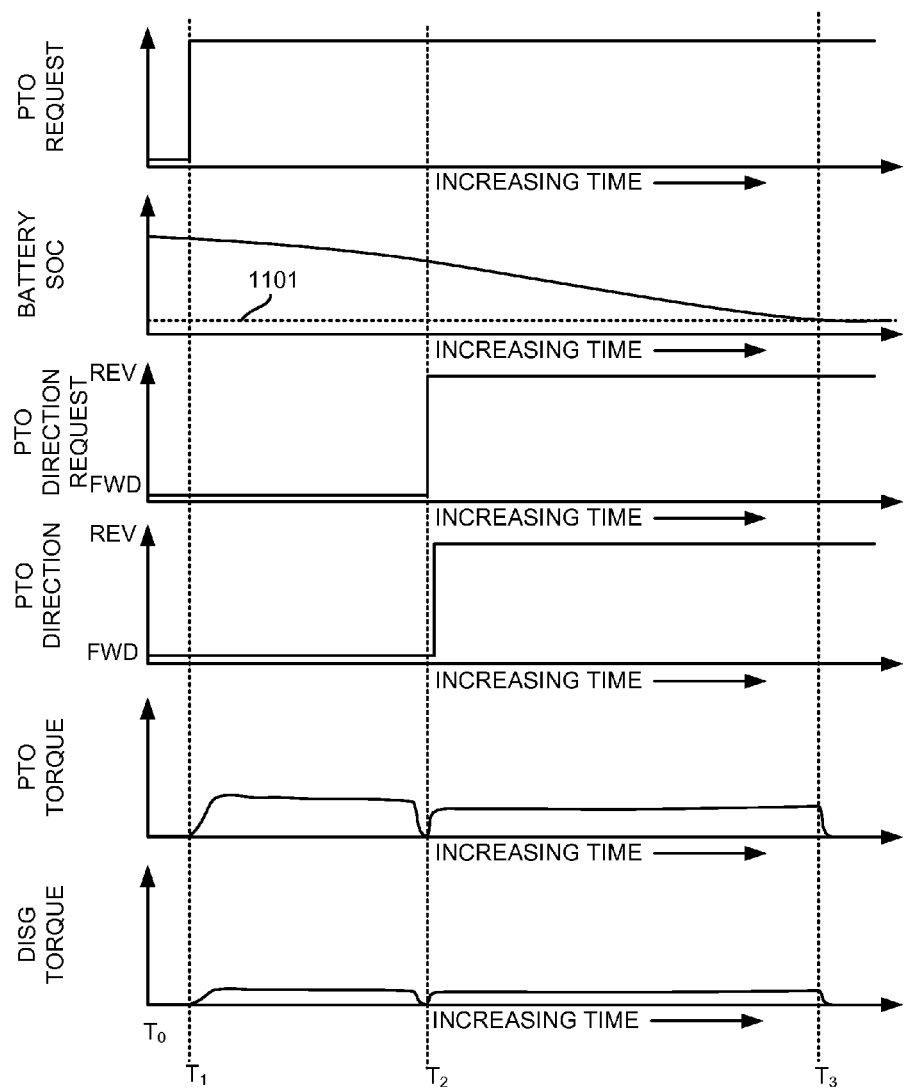
FIG. 11 is a prophetic example sequence for operating a vehicle that includes a PTO.
Figure 12:
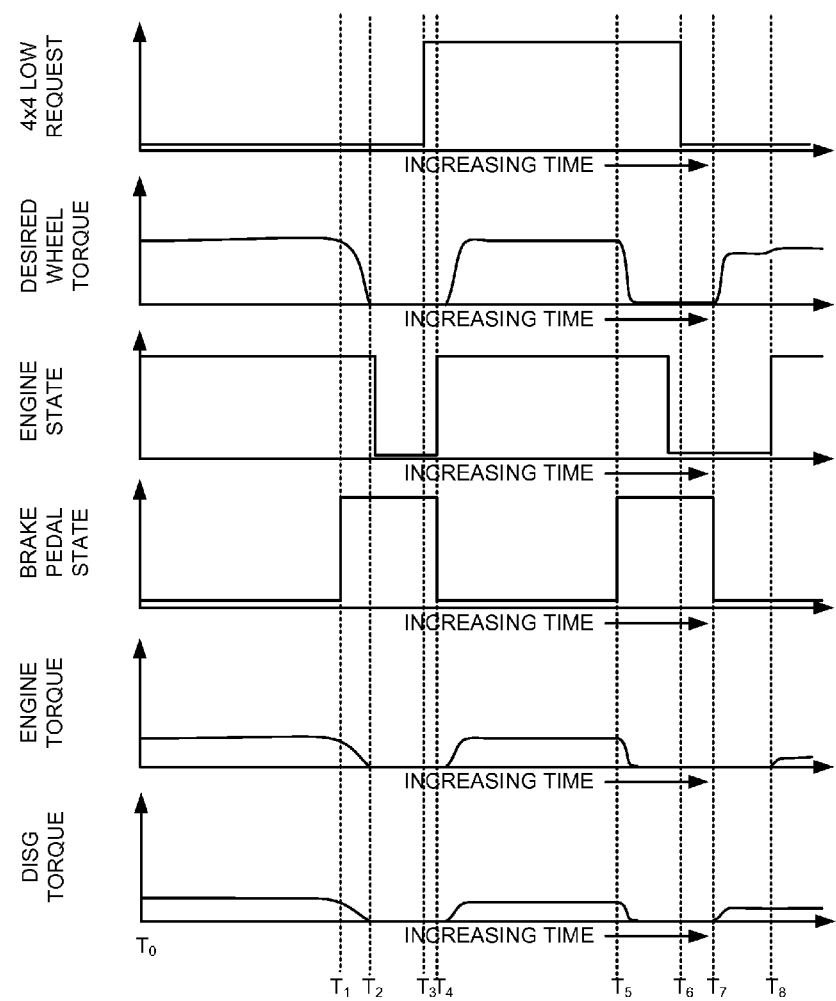
FIG. 12 is a prophetic example sequence for operating a vehicle that includes a 4×4 low gear range mode.
Figure 13:
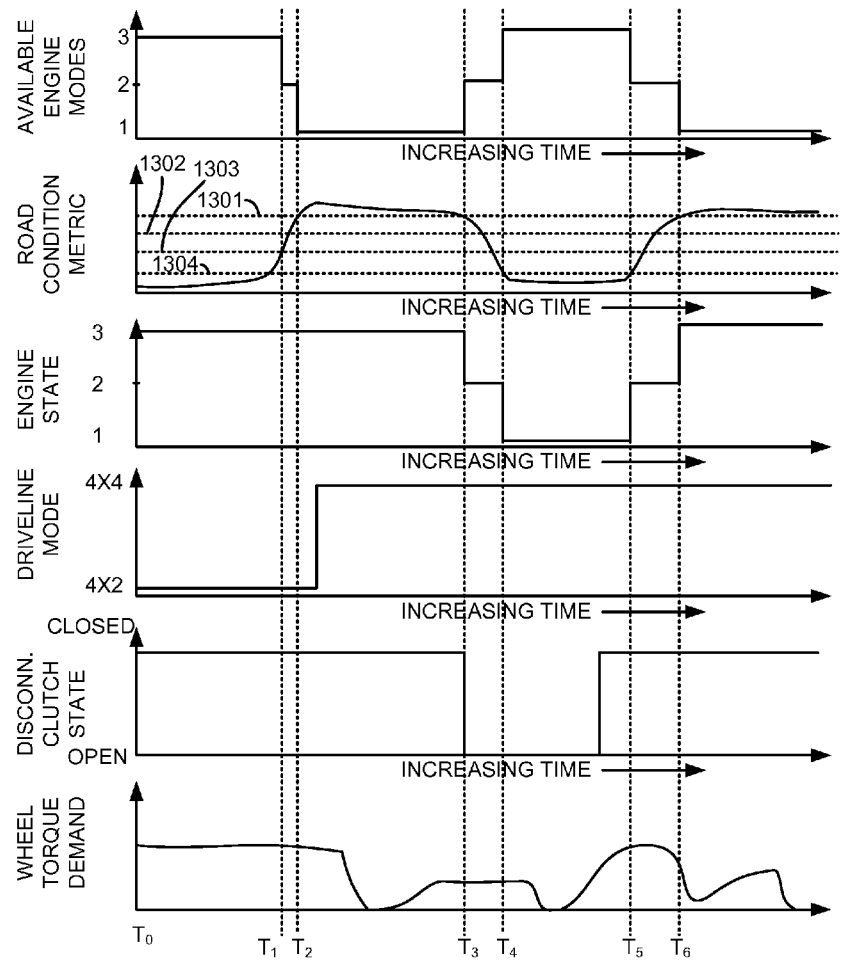
FIG. 13 is a prophetic example sequence for operating a vehicle in response to a driving surface.

The present description is related to controlling a driveline of a hybrid vehicle. The hybrid vehicle may include an engine and electric machine as shown in FIGS. 1-3. The engine may be operated with or without a driveline integrated starter/generator (DISG) during vehicle operation. The driveline integrated starter/generator is integrated into the driveline on the same axis as the engine crankshaft and rotates whenever the torque converter impeller rotates. Further, the DISG may not be selectively engaged or disengaged with the driveline. Rather, the DISG is an integral part of the driveline. Further still, the DISG may be operated with or without operating the engine. The mass and inertia of the DISG remain with the driveline when the DISG is not operating to provide or absorb torque from the driveline. The vehicle driveline may be operated according to the method shown in FIGS. 4-10. FIGS. 11-13 show example vehicle operating sequences according to the method shown in FIGS. 4-10.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes or regenerative braking via a DISG may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2 and 3. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output power capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 may include a power take off (PTO) 251 that can direct driveline torque to an external or ancillary mechanical load 252. The PTO 251 may be located on the impeller side of the torque converter or on the turbine side of the torque converter. In some examples, the PTO may be included in the automatic transmission 208. PTO 251 may also include a reverse gear 287.

Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Mechanical load 252 may be a hydraulic pump that operates a snow plow lift or cement mixer. Alternatively, mechanical load 252 may be a rotating mechanical device. Mechanical load controller 253 may communicate with controller 12 via communication link 291 to provide position, speed, and torque information of mechanical load 252 via sensors 254. Sensors 254 provide position and speed information to mechanical load controller 253 which may in turn relay the information to controller 12 so that the PTO may be controlled.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle frame as described in U.S. patent application Ser. No. 12/833,788 "METHOD FOR CONTROLLING AN ENGINE THAT MAY BE AUTOMATICALLY STOPPED" which is hereby fully incorporated by reference for all intents and purposes. A transmission clutch pressure may be varied (e.g., increased) to adjust the engagement state of a transmission clutch, and provide a desired amount of transmission torsion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted. When restart conditions are satisfied, and/or a vehicle operator wants to launch the vehicle, controller 12 may reactivate the engine by resuming cylinder combustion.

Referring now to FIG. 3, a second example vehicle driveline configuration is shown. The elements in driveline 300 that have the same reference numbers as elements in FIG. 2 are equivalent elements and operate as described in FIG. 2. Therefore, for the sake of brevity, the description of elements that are common between FIG. 2 and FIG. 3 is omitted. The description of FIG. 3 is limited to elements that are different from the elements of FIG. 2.

Driveline 300 includes a dual clutch—dual layshaft transmission 308. Transmission 308 is essentially an automatically operated manual transmission. Controller 12 operates first clutch 310, second clutch 314, and shifting mechanism 315 to select between gears (e.g., $1^{st}$-$5^{th}$ gears) 317. First clutch 310 and second clutch 314 may be selectively opened and closed to shift between gears 317. Output shaft 260 delivers torque from transmission 308 to wheels 216.

Figure 4:
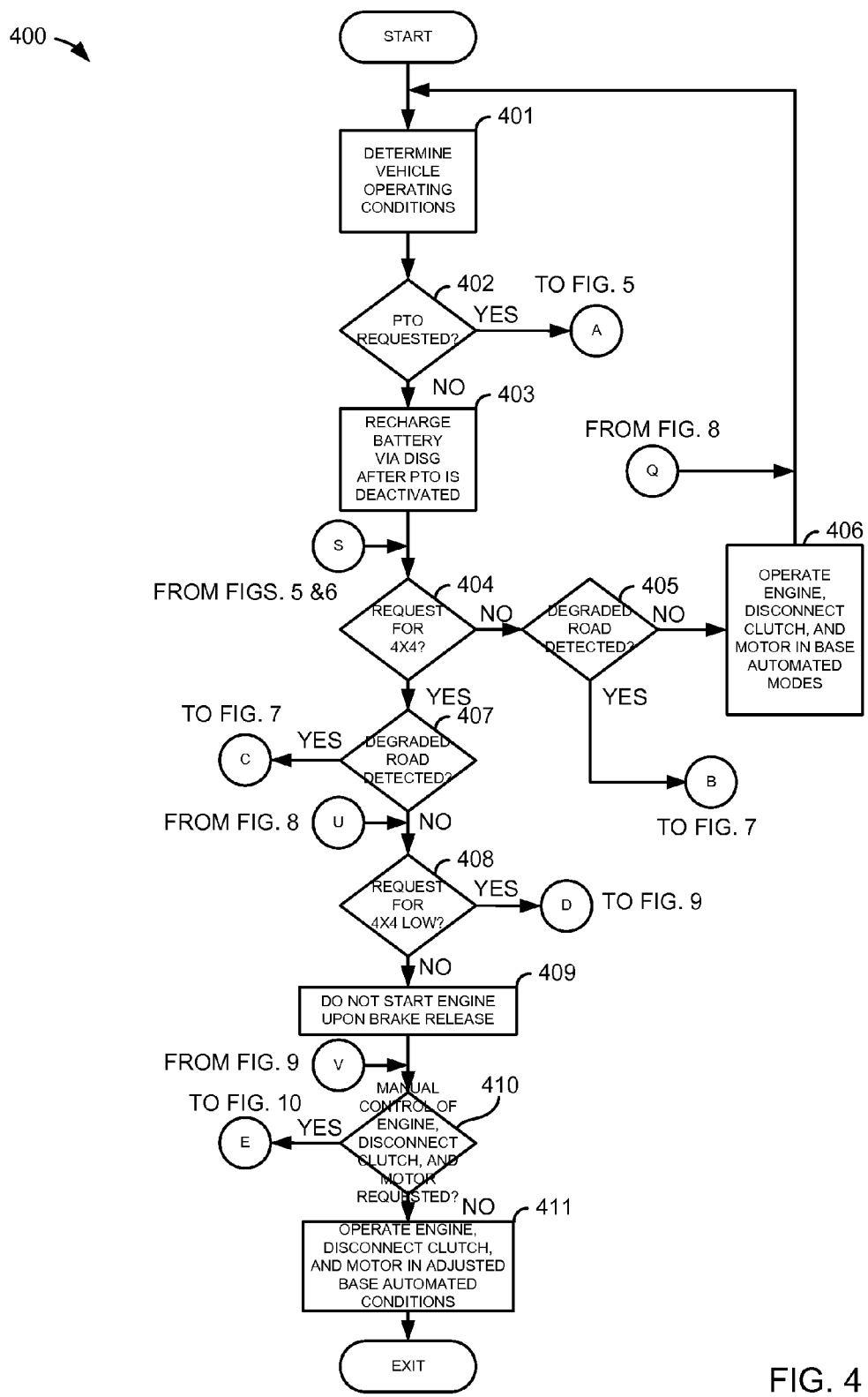
FIG. 4 is a first portion of a flowchart for controlling a driveline of a hybrid vehicle.

Referring now to FIG. 4, a flowchart of an example method for controlling a driveline of a hybrid vehicle is shown. The method of FIG. 4 may be stored as executable instructions in non-transitory memory of controller 12 shown in the systems of FIGS. 1-3.

At 401, method 400 determines vehicle operating conditions. Vehicle operating conditions may include but are not limited to vehicle speed, brake pedal position, engine speed, engine load, 4×4 selection mode, 4×2 selection mode, vehicle chassis information (e.g., wheel vertical motion, yaw, pitch, and roll), and driving surface incline. Method 400 proceeds to 402 after vehicle operating conditions are determined.

At 402, method 400 judges whether or not a PTO operation request has been received. A PTO operation request may be made by a vehicle driver or an external controller communicating with powertrain controller 12 shown in FIGS. 1-3. A PTO operation request indicates that it is desired for an external load to receive power from the engine 10 and/or electric machine 240. If method 400 judges that a PTO operation request has been made, the answer is yes and method 400 proceeds to 412 of FIG. 5. Otherwise, the answer is no and method 400 proceeds to 403.

Figure 5:
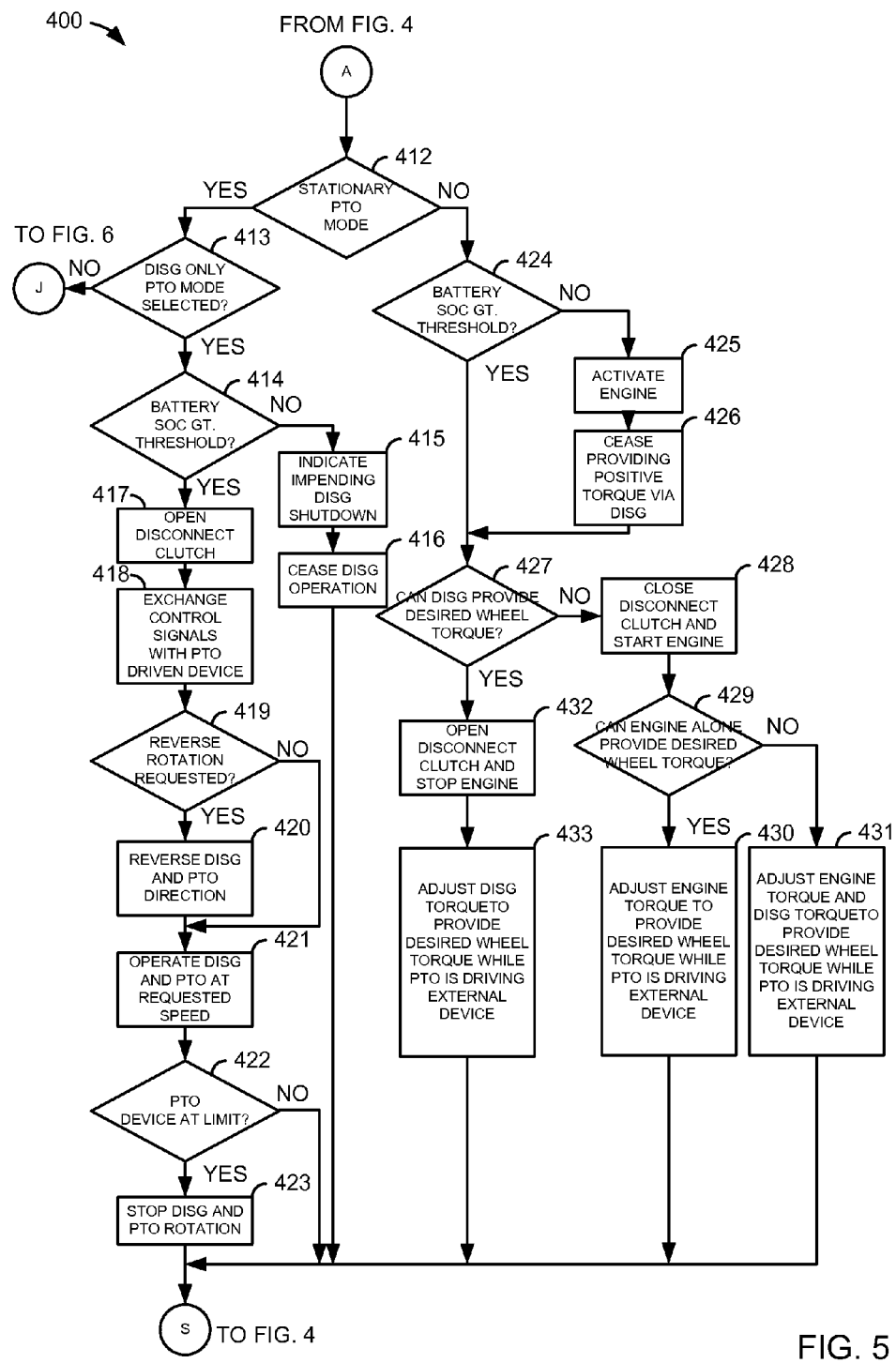
FIG. 5 is a second portion of the flowchart for controlling the driveline of the hybrid vehicle.
Figure 6:
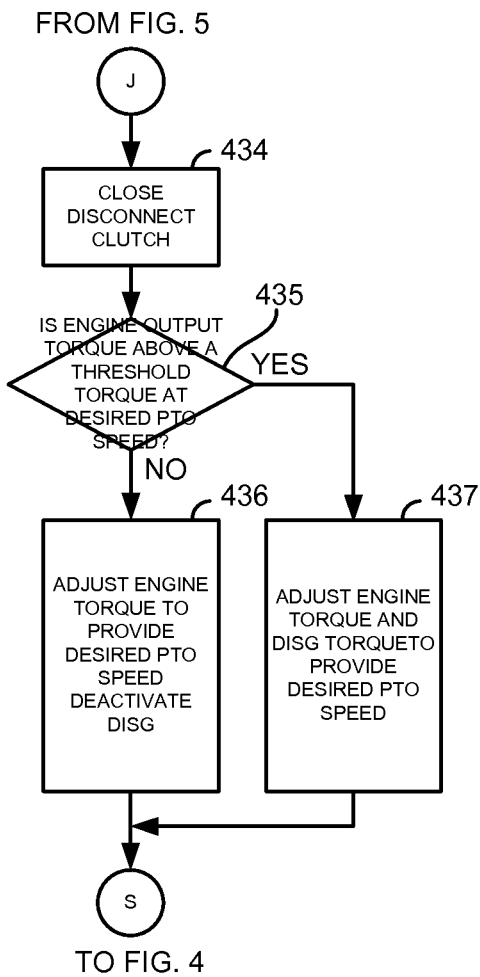
FIG. 6 is a third portion of the flowchart for controlling the driveline of the hybrid vehicle.

Referring now to FIG. 5, method 400 judges whether or not the PTO operation request is for a stationary mode where the vehicle is parked or in a non-stationary mode where the vehicle may move at 412. Stationary mode may be useful for external loads that are not required to move. In stationary mode, the PTO speed may be requested to be a fixed speed (e.g., 540 RPM) input via control commands from an external load device (e.g., a hydraulic pump controller) or a driver while the vehicle is stopped and/or parked. In non-stationary mode, the PTO speed may vary with engine/motor speed and vehicle speed. Thus, torque may be provided to the PTO and to provide motive force for the vehicle. If method 400 judges that stationary mode is requested, the answer is yes and method 400 proceeds to 413. Otherwise, the answer is no and method 400 proceeds to 424.

At 413, method 400 judges whether DISG or electric machine only PTO mode is selected. In DISG only PTO mode, the PTO is supplied torque via only the DISG and not the engine. Such operation allows the PTO to operate in reverse and forward directions. If method 400 judges that DISG only PTO mode is selected the answer is yes and method 400 proceeds to 414. Otherwise, the answer is no and method 400 proceeds to 434 of FIG. 6.

At 434, method 400 closes the driveline disconnect clutch so that the engine and DISG are mechanically coupled together. The engine or the DISG may be selectively deactivated while the driveline disconnect clutch is closed. Method 400 proceeds to 435 after the disconnect clutch is closed.

At 435, method 400 judges whether or not engine output is above or alternatively within a threshold torque range of a threshold torque level. If engine output torque is within or above a threshold torque, the answer is yes and method 400 proceeds to 437. Otherwise, the answer is no and method 400 proceeds to 436. For example, if engine torque is 100 N-m, the threshold torque range is 10 N-m, and the threshold torque is 108 N-m, then the answer is yes and method 400 proceeds to 437.

At 437, method 400 adjusts engine torque and DISG torque to provide the desired PTO speed. In one example, engine load is adjusted to a threshold level (e.g., 90 percent of maximum engine torque) and then DISG output torque is increased to a level where the desired PTO speed is provided. If the DISG output torque is at a maximum level and PTO speed is less than desired PTO speed, engine torque may be increased to a maximum level at the present PTO speed. Method 400 proceeds to 404 of FIG. 4 after engine and DISG torque are adjusted.

In other examples, while battery state of charge is greater than a threshold level, the DISG may output torque to a threshold level before the engine is activated. Further, the engine may charge vehicle batteries and provide electrical power to the vehicle's electric network while the PTO is in a stationary mode and PTO torque requirements are less than available engine output torque. Thus, the engine may drive the PTO load while the DISG converts engine torque to electricity to charge the vehicle batteries.

At 436, method 400 adjusts engine torque to provide the desired PTO speed while the DISG is deactivated. Alternatively, the DISG may be in a generating mode supplying current to vehicle batteries at 436. The PTO speed may be maintained by controller 12 which determines an error between desired PTO speed and actual PTO speed. If actual PTO speed is less than desired PTO speed, the engine throttle may be opened further to increase engine torque, thereby increasing PTO speed. If actual PTO speed is greater than desired PTO speed, the engine torque may be decreased via at least one of a plurality of actuators (e.g., throttle, cam timing, waste gate, fuel injectors, spark timing, etc.), thereby reducing PTO speed. Method 400 proceeds to 404 of FIG. 4 after engine torque is adjusted.

Returning now to FIG. 5, method 400 judges whether or not battery state of charge (SOC) is greater than a threshold charge level at 414. In one example, the threshold state of charge may be estimated via measuring battery voltage. If battery charge is greater than a threshold level, the answer is yes and method 400 proceeds to 417. Otherwise, the answer is no and method 400 proceeds to 415. In one example, the threshold state of charge is a minimum charge level where battery degradation does not occur.

At 415, method 400 indicates an impending DISG shutdown. A DISG shutdown may be indicated via a light, display panel, or audible actuator. The indication of an impending shutdown may be provided at a battery state of charge that is above the threshold charge level mentioned at 414. Alternatively, the engine may be automatically started when the battery charge is reduced to the threshold level and the PTO continues to operate.

At 416, method 400 ceases to provide torque to the PTO via the DISG. The DISG torque may be ramped down in a controlled manner so as to avoid a rapid change in PTO torque. Method 400 proceeds to 404 of FIG. 4.

At 417, method 400 opens the driveline disconnect clutch. Opening the driveline disconnect clutch mechanically decouples the engine from the DISG. Thus, the DISG can supply torque to the PTO without having losses due to rotating an engine that is not combusting air-fuel mixtures. Since the PTO is in stationary mode, most of the torque provided by the DISG is transferred to the PTO. Method 400 proceeds to 418 after the disconnect clutch is opened.

At 418, method 400 exchanges control signals with a mechanical load controller (e.g., 253 of FIG. 2). The mechanical load controller may control the PTO and the engine to provide a desired PTO output. Alternatively, the mechanical load controller may receive instructions from the powertrain controller and provide control signals from sensors to the powertrain controller. Example signals exchanged between the mechanical load controller and the powertrain controller include but are not limited to PTO speed, PTO device position (e.g., a position of an actuator such as a ball screw), PTO engage signal, PTO disengage signal, PTO device end of travel, PTO rotation direction, and PTO stop signal. Method 400 proceeds to 419 after signals are exchanged between the mechanical load controller and the powertrain controller.

At 419, method 400 judges whether or not reverse PTO rotation is requested. Reverse PTO rotation may be requested by an operator or a controller such as the mechanical load controller. If method 400 judges that a request for reverse rotation is present, the answer is yes and method 400 proceeds to 420. If method 400 judges that a request for reverse rotation is not present, the answer is no, the PTO rotates in a forward direction, and method 400 proceeds to 421.

At 420, the DISG is rotated so that the PTO rotates in a reverse direction. Reverse DISG rotation may be provided via a reverse gear that is incorporated into the PTO device. The reverse gear may be selectively engaged. Alternatively, the DISG may be rotated in a reverse direction so that the PTO rotates in a reverse direction without a reverse gear. Reverse DISG rotation may be provided via electric commutation or alternatively in some configurations by reversing polarity of power applied to the DISG.

At 421, method 400 operates the DISG and PTO at the desired speed. In one example, the DISG speed is controlled according to the actual PTO speed. For example, the actual PTO speed may be subtracted from the desired PTO speed to provide a PTO speed error. The current supplied to the DISG may then be adjusted to adjust the DISG torque so as to provide zero error between the actual PTO speed and the desired PTO speed. If actual PTO speed is less than desired PTO speed, the DISG current may be increased. Alternatively, depending on the DISG design, the frequency of power supplied to the DISG may be adjusted to adjust the DISG torque. Method 400 proceeds to 422 after DISG speed is adjusted to provide the desired PTO speed.

At 422, method 400 judges whether or not a PTO operated device is at a limit. In one example, the PTO operated device may be a ball screw with start of travel and end of travel limit switches. If the PTO operated device is at a travel limit the answer is yes and method 400 proceeds to 423. Otherwise, the answer is no and method 400 proceeds to 404 of FIG. 4.

At 423, method 400 stops DISG and PTO rotation. DISG and PTO rotation may be ramped down at a predetermined rate once the PTO operated device reaches a limit condition. The DISG may be restarted in an opposite direction via an operator or controller input. In this way, the DISG may be operated with the PTO such that the PTO operated device moves between two limit positions. Method 400 proceeds to 404 of FIG. 4 after DISG rotation is ceased.

At 424, method judges whether or not battery state of charge is greater than a threshold state of charge. If battery state of charge is greater than the threshold level, the answer is yes and method 400 proceeds to 427. Otherwise, the answer is no and method 400 proceeds to 425. The threshold state of charge helps to ensure that the DISG may be supplied enough power to continue rotating the PTO.

At 425, method 400 activates the engine if the engine is stopped. The engine may be activated by starting the engine. In one example, the engine may be started via supplying air, spark, and fuel to the engine while the disconnect clutch is engaged with the DISG rotating. Method 400 proceeds to 426 after the engine is activated.

At 426, method 400 stops providing positive torque (e.g., torque to rotate the driveline) via the DISG. However, the DISG may provide electrical energy to vehicle batteries via transforming driveline rotational energy into electrical energy. Method 400 proceeds to 427 after DISG positive output torque has been reduced.

At 427, method 400 judges whether or not the DISG can provide the desired amount of wheel torque plus an additional predetermined amount of torque to rotate the PTO. In one example, 25% of the available DISG torque is reserved for PTO operation. For example, if the DISG has a torque output capacity of 100 N-m at speeds below its base speed, 75 N-m of DISG torque can be provided to produce wheel torque. The remaining 25 N-m is reserved for providing PTO torque. However, if the desired wheel torque is low, the PTO may receive up to 75% of the available DISG output torque. The desired wheel torque may be determined by inputting accelerator pedal position into a look up function or table that converts pedal position into desired impeller, turbine, transmission output or wheel torque. The desired torque is then compared to torque that is available via the DISG. The available DISG torque may be stored in memory in a lookup table that is indexed via battery state of charge and DISG speed. If the available DISG torque is greater than the DISG torque that produces the desired torque, the answer is yes and method 400 proceeds to 432. Otherwise, the answer is no and method 400 proceeds to 428. Note that the desired torque may be converted into a desired DISG torque by accounting for transmission gear ratios and transmission losses, as appropriate depending on the form of desired torque.

At 428, method 400 closes the disconnect clutch. The disconnect clutch is closed so that torque provided by the DISG may be augmented by engine torque. Further, the engine is started if it is not already running. In this way, torque provided by the DISG may be combined with engine torque to provide the desired wheel torque while the PTO in operating and the vehicle is moving. Method 400 proceeds to 429 after the disconnect clutch is closed and the engine is started.

At 429, method 400 judges whether or not the engine alone, without the DISG providing positive torque to the driveline, has torque capacity to provide the desired wheel torque plus an additional predetermined amount of torque to rotate the PTO. In one example, the desired wheel torque may be converted into a desired engine torque via accounting for transmission gearing and losses. In one example, 25% of the available engine torque is reserved for PTO operation. For example, if the engine has a torque output capacity of 200 N-m at a particular speed, 150 N-m of engine torque can be provided to produce wheel torque. The remaining 50 N-m is reserved for providing PTO torque. However, if the desired wheel torque is low, the PTO may receive up to 75% of the available engine output torque. In one example, the desired wheel torque is compared to torque that is available via the engine. The available engine torque may be stored in memory in a lookup table that is indexed via engine speed and adjusted for ambient air density or calculated real-time based on a model of the maximum engine torque at current conditions and hardware capability. If the available engine torque is greater than the engine torque that produces the desired wheel torque, the answer is yes and method 400 proceeds to 430. Otherwise, the answer is no and method 400 proceeds to 431. Note that the desired wheel torque may be converted into a desired engine torque by accounting for transmission gear ratios and transmission losses.

At 430, method 400 adjusts engine torque to provide desired wheel torque while the PTO is driving an external device. Since the amount of engine torque transferred to the PTO may not be known in some examples, the torque provided to the PTO may be determined and added to the desired engine torque so that the desired wheel torque is provided. In one example, torque provided to the PTO may be determined from the equation:

$$T_{Pto} = T_{eng} - Tc_{mult} \cdot T_{gear\_ratio} \cdot T_{axle\_ratio} \cdot T_{driveline\_losses} \cdot F_{Grade}$$

where $T_{wheel}$ is desired wheel torque, $T_{eng}$ is desired engine torque, $T_{pto}$ is PTO torque, $Tc_{mult}$ is the torque converter multiplication ratio, $T_{gear\_ratio}$ is the current transmission gear ratio, $T_{axle\_ratio}$ is the axle ratio, $T_{driveline\_losses}$ is a multiplier that reflects driveline losses, and $F_{Grade}$ is a grade multiplier that accounts for road grade determined via the inclinometer. The desired engine torque may be estimated via a map of engine torque that is indexed by engine speed and load. The wheel torque may be estimated from the equation:

$$T_{wheel} = (T_{eng} - T_{pto}) \cdot Tc_{mult} \cdot T_{gear\_ratio} \cdot T_{axle\_ratio} \cdot T_{driveline\_losses} \cdot F_{Grade}$$

The torque converter torque multiplication ratio, the gear ratio, axle ratio, and driveline torque loss multiplier may be empirically determined and retrieved from memory based on engine speed, vehicle speed, selected gear ratio, and other factors. The vehicle inertia may be adjusted for varying vehicle mass.

If the estimated wheel torque is less than desired, the desired engine torque may be increased via adjusting engine torque to increase the actual wheel torque to the desired wheel torque. In this way, engine torque may be increased to provide the desired wheel torque even though the amount of torque consumed by the PTO is unknown. Method 400 proceeds to 404 of FIG. 4.

At 431, method 400 adjusts engine torque and DISG torque to provide the desired wheel torque while the PTO is driving an external device. In one example, the engine is operated at an efficient operating condition based on vehicle speed and the selected transmission gear. If the desired wheel torque is not available at the operating condition, DISG output torque is increased to provide the desired wheel torque. If the DISG does not have the capacity to provide the desired wheel torque in the presence of a PTO load, the engine operation is adjusted to increase engine torque output at a lower fuel efficiency operating condition. DISG torque is increased via increasing current supplied to the DISG. Engine torque is adjusted via adjusting throttle position, waste gate position, cam timing, fuel amount, and spark timing. In one example, the wheel torque may be determined according to the following equation when the DISG is providing torque to the driveline:

$$T_{wheel} = (T_{eng} - T_{pto} \cdot T_{DISG}) \cdot Tc_{mult} \cdot T_{gear\_ratio} \cdot T_{axle\_ratio} \cdot T_{driveline\_losses} \cdot F_{Grade}$$

where $T_{DISG}$ is the amount of torque provided to the driveline via the DISG and where the remaining variables are as described above. Thus, the engine torque and the DISG torque can be adjusted to provide the desired wheel torque in the presence of a PTO load. Method 400 proceeds to 404 of FIG. 4 after the engine torque and DISG torque are adjusted.

At 432, the disconnect clutch is opened and the engine is stopped. The disconnect clutch is opened so that the DISG does not have to rotate the deactivated engine. The engine is deactivated to conserve fuel. Method 400 proceeds to 433 after the disconnect clutch is opened.

At 433, method 400 adjusts DISG torque via adjusting current supplied to the DISG. In one example, the DISG torque is adjusted to provide the desired wheel torque while the PTO is passively operated. For example, if 15 N-m of wheel torque is desired and the PTO is consuming 5 N-m, the DISG torque is adjusted to 20 N-m by increasing DISG torque until the vehicle accelerates at a rate expected when there is 15 N-m of wheel torque.

Returning now to FIG. 4, method 400 recharges the batteries via the DISG transforming rotational energy from the engine or kinetic vehicle energy into electrical energy at 403. In some examples, battery charging may be delayed after PTO operation until the vehicle is in a deceleration condition or traveling down a hill where the vehicle's kinetic energy can be converted to electrical energy without combusting an air-fuel mixture to provide the electrical energy. In other examples, the batteries may be charged to a threshold level via converting engine rotational energy into electrical energy. Once the batteries reach the threshold level, any additional battery charging may originate solely from vehicle kinetic energy. Method 400 proceeds to 404 after battery charging is initiated.

At 404, method 400 judges whether or not there is a request for 4×4 mode (e.g., four wheel drive mode). A request for 4×4 mode may be made by a driver or an external controller (e.g., a controller that senses wheel slip). If method 400 judges that a request for 4×4 mode is present, the answer is yes and method 400 proceeds to 407. Otherwise, the answer is no and method 400 proceeds to 405. In some examples, method 400 automatically starts a stopped engine when the driver selects a four wheel high or low gear range while the vehicle is in a two wheel drive mode.

At 405, method 400 judges whether or not degraded (e.g., rough, curvy (frequency of road turns), slick, or obstructed) road conditions are present. In one example, a rough road may be determined based on a vertical travel distance and frequency of vertical motion of vehicle wheels. Slick roads may be determined by an amount of wheel slippage. An object obstructing a road in front of the vehicle may be detected via an optical, sonic, or radar sensing device. If a rough, curvy, slick, or obstructed road is present, the answer is yes and method 400 proceeds to 450 of FIG. 7. Otherwise, the answer is no and method 400 proceeds to 406.

At 406, method 400 operates the engine and driveline disconnect clutch according to base two wheel drive automated modes. During two wheel drive modes, the DISG may be selectively coupled to the engine via the vehicle disconnect clutch to provide wheel torque and to charge vehicle batteries and provide electrical power to the vehicle's electric network. In one example, the DISG provides torque to the vehicle driveline during vehicle acceleration while battery SOC is above a threshold SOC. Further, the DISG provides electrical energy to vehicle batteries during vehicle deceleration and during hill decent conditions. Method 400 returns to 401 after the engine and DISG are operated according to base two wheel drive mode conditions.

Figure 7:
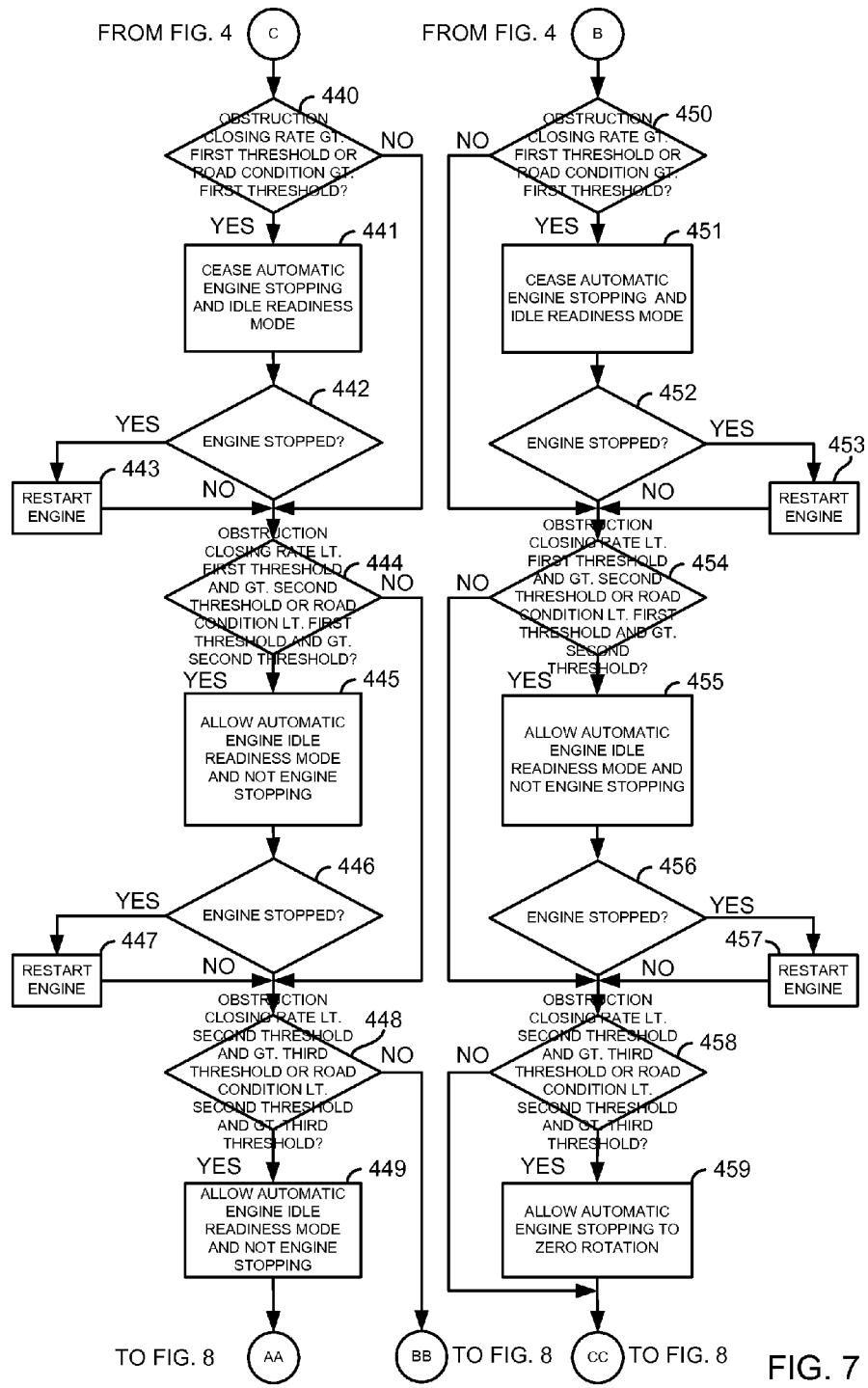
FIG. 7 is a fourth portion of the flowchart for controlling the driveline of the hybrid vehicle.

Referring now to FIG. 7, method 400 judges whether or not closing rate (e.g., a rate the vehicle approaches an object) is faster (e.g., a shorter time between contact between the vehicle and the object) than a first threshold closing rate or if a degraded road condition (e.g., curvy, slick, or rough road condition) metric (e.g., a number representing a curvy, slick, or rough road condition) is greater than a first threshold road condition metric amount at 450. In other words, method 400 judges whether or not a higher level of road roughness, curviness, slickness, or a high rate of closing to an object is present. If method 400 judges that a road condition metric is greater than a first threshold road condition parameter, or if the vehicle closing rate is faster than a first vehicle threshold closing rate, the answer is yes and method 400 proceeds to 451. Otherwise, the answer is no and method 400 proceeds to 454.

At 451, method 400 ceases automatic engine stopping and engine idle readiness mode. Engine idle readiness mode is a mode where the engine is allowed to idle with the driveline disconnect clutch in an open state and while the DISG provides torque to the driveline. For example, method 400 may prevent automatic engine stopping during vehicle deceleration or when the vehicle is stopped. Automatic engine stopping is an engine stop that is initiated by a controller based on inputs without a specific engine stop request provided by a driver input that has a sole purpose of stopping and/or starting the engine. By ceasing automatic engine stopping, the powertrain may be in a state that is better suited to responding to road and vehicle conditions. For example, full powertrain torque (e.g., via the engine and DISG) is available so that the vehicle may overcome or accelerate away from undesirable conditions. Further, the driveline disconnect clutch is closed or held closed at 451 so that the engine and DISG rotate at a same rate. Method 400 proceeds to 452 after automatic engine rotation stopping is ceased.

At 452, method 400 judges whether or not the engine has presently stopped rotating. The engine may be judged to be stopped rotating when engine rotational speed is zero. If method 400 judges that the engine is stopped rotating, the answer is yes and method 400 proceeds to 453. Otherwise, the answer is no and method 400 proceeds to 454.

At 453, method 400 restarts the engine to ready it for any action the driver may take. The engine may be started rotating via closing the driveline disconnect clutch and supplying spark and fuel to the engine. Method 400 proceeds to 454 after the engine is restarted.

At 454, method 400 judges whether or not closing rate is slower than the first threshold closing rate and faster than a second threshold closing rate, or if a road condition (e.g., a slick or rough road condition) metric is less than the first threshold road condition parameter and greater than a second threshold road condition parameter. The second threshold closing rate is lower than the first threshold closing rate. The second threshold road condition is lower than the first threshold road conditions. In other words, method 400 judges whether or not a mid-higher level of road roughness, curviness, slickness, or a mid-high rate of closing to an object is present. If method 400 judges that the road condition is less than the first threshold road condition and greater than the second threshold road condition, or if the vehicle closing is less than the first vehicle threshold closing rate and greater than the second vehicle threshold closing rate, the answer is yes and method 400 proceeds to 455. Otherwise, the answer is no and method 400 proceeds to 458.

At 455, method 400 allows automatic engine output reduction to engine idle readiness mode via opening the driveline disconnect clutch during low wheel torque request conditions, but automatic stopping of engine rotation is not allowed. For example, at low desired wheel torques, the engine can be decoupled from the DISG, and then the engine speed is reduced to an idle speed. Torque may be provided to the driveline via the DISG. If the wheel torque demand increases, the engine speed is increased to DISG speed, and then the driveline disconnect clutch is closed. In this way, method 400 increases the vehicle's state of readiness during some conditions but allows fuel to be conserved by allowing the engine to idle rather than rotating synchronously with the DISG when the vehicle is in 4×2 operating mode. Method 400 proceeds to 456 after automatic stopping conditions are revised.

At 456, method 400 judges whether or not the engine is presently stopped rotating. The engine may be judged to be stopped rotating when engine rotational speed is zero. If method 400 judges that the engine rotation is stopped, the answer is yes and method 400 proceeds to 457. Otherwise, the answer is no and method 400 proceeds to 458.

At 457, method 400 restarts the engine to ready it for any action the driver may take. The engine may be started via closing the driveline disconnect clutch and supplying spark and fuel to the engine. Method 400 proceeds to 458 after the engine is restarted.

At 458, method 400 judges whether or not a closing rate is slower than the second threshold closing rate and faster than a third threshold closing rate, or if a road condition metric (e.g., a slick or rough road condition) is less than the second threshold road condition parameter and greater than a third threshold road condition parameter. The third threshold closing rate is slower (e.g., a longer time period between contact between the vehicle and the object) than the second threshold closing rate. The third threshold road condition parameter is lower than the second threshold road condition parameter. In other words, method 400 judges whether or not a middle level of road roughness, curviness, slickness, or a middle rate of closing to an object is present. If method 400 judges that a road condition metric is less than the second threshold road condition parameter and greater than the third threshold road condition parameter, or if the vehicle closing is slower than the second vehicle threshold closing rate and faster than the third vehicle threshold closing rate, the answer is yes and method 400 proceeds to 459. Otherwise, the answer is no and method 400 proceeds to 464 of FIG. 8.

At 459, method 400 allows automatic engine stopping rotation to zero engine speed. The engine speed may be reduced to zero when the vehicle wheel torque demand is low by opening the driveline disconnect clutch and ceasing fuel flow to the engine. The DISG may continue to provide torque to the vehicle driveline to propel the vehicle. In this way, method 400 allows further reduction in fuel consumption when the vehicle is in a two wheel drive mode rather than a four wheel drive mode. Method 400 proceeds to 464 of FIG. 8 after automatic engine stopping conditions are revised.

It should be noted that method 400 may substitute a closing distance less than a first, second, or third threshold for the closing rate greater than a first, second, or third threshold at 440, 444, 448, 450, 454 and 458 if desired. Alternatively, method 400 may judge whether or not a closing rate is greater than a first, second, or third threshold, and whether a closing distance is less than a first, second, or third threshold at 440, 444, 448, 450, 454, and 458.

Figure 8:
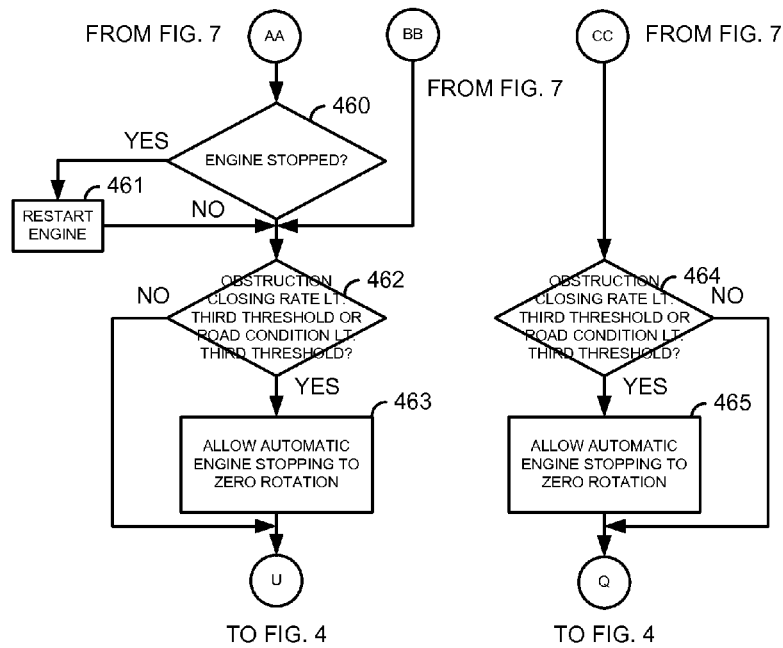
FIG. 8 is a fifth portion of the flowchart for controlling the driveline of the hybrid vehicle.

Referring now to FIG. 8, it is judged whether or not a closing rate is slower than the third threshold closing rate or if a road condition metric (e.g., a number representing a curvy, slick, or rough road condition) is less than the third threshold road condition parameter at 464. In other words, method 400 judges whether or not a lower level of road roughness, curviness, slickness, or a lower rate of closing to an object is present. If method 400 judges that a road condition metric is less than the third threshold road condition parameter, or if the vehicle closing is slower than the third vehicle threshold closing rate parameter, the answer is yes and method 400 proceeds to 465. Otherwise, the answer is no and method 400 returns to 401 of FIG. 4.

At 465, method 400 allows automatic engine stopping rotation to zero engine speed. The engine speed may be reduced to zero when the vehicle wheel torque demand is low by opening the driveline disconnect clutch and ceasing fuel flow to the engine. If the wheel torque demand increases, the engine may be restarted via the DISG or a starter and the driveline disconnect clutch may be closed so that driveline and wheel torque is increased. The DISG may continue to provide torque to the vehicle driveline to propel the vehicle while decoupled from the engine. Method 400 returns to 401 of FIG. 4 after automatic engine stopping conditions are revised.

Referring now to FIG. 4, at 407 method 400 judges whether or not degraded (e.g., rough, curvy, slick, or obstructed) road conditions are present. Road conditions and obstructions may be determined as described at 405. If a rough, curvy, slick, or obstructed road is present, the answer is yes and method 400 proceeds to 440 of FIG. 7. Otherwise, the answer is no and method 400 proceeds to 408.

Referring now to FIG. 7, method 400 judges whether or not closing rate (e.g., a rate the vehicle approaches an object) is faster (e.g., a shorter time between contact between the vehicle and the object) than a first threshold closing rate or if a road condition (e.g., curvy, slick, or rough road condition) metric is greater than a first threshold road condition metric amount at 440. In other words, method 400 judges whether or not a higher level of road roughness, curviness, slickness, or a high rate of closing to an object is present. If method 400 judges that a road condition metric is greater than a first threshold road condition parameter, or if the vehicle closing rate is faster than a first vehicle threshold closing rate, the answer is yes and method 400 proceeds to 441. Otherwise, the answer is no and method 400 proceeds to 444.

The first through third threshold road conditions mentioned between 440 and 448 may be the same or different than the first through third threshold road conditions mentioned between 450 and 458. Similarly, the first through third threshold closing rates mentioned between 440 and 448 may be the same or different than the first through third threshold closing rates mentioned between 450 and 458.

At 441, method 400 ceases automatic engine stopping. For example, method 400 prevents automatic engine stopping during vehicle deceleration or when the vehicle is stopped. Automatic engine stopping is an engine stop that is initiated by a controller based on inputs without a specific engine stop request provided by a driver input that has a sole purpose of stopping and/or starting the engine. By ceasing automatic engine stopping, the powertrain may be in a state that is better suited to responding to road and vehicle conditions. For example, full powertrain torque (e.g., via the engine and DISG) is available so that the vehicle may overcome or accelerate away from undesirable conditions. Further, the driveline disconnect clutch is closed or held closed at 441 so that the engine and DISG rotate at a same rate. Method 400 proceeds to 442 after automatic engine rotation stopping is ceased.

At 442, method 400 judges whether or not the engine has presently stopped rotating. The engine may be judged to be stopped rotating when engine rotational speed is zero. If method 400 judges that the engine is stopped rotating, the answer is yes and method 400 proceeds to 443. Otherwise, the answer is no and method 400 proceeds to 444.

At 443, method 400 restarts the engine rotating to ready it for any action the driver may take. The engine may be started rotating via closing the driveline disconnect clutch and supplying spark and fuel to the engine. Method 400 proceeds to 444 after the engine is restarted.

At 444, method 400 judges whether or not closing rate is slower than the first threshold closing rate and faster than a second threshold closing rate, or if a road condition (e.g., a slick, curvy, or rough road condition) metric is less than the first threshold road condition parameter and greater than a second threshold road condition parameter. The second threshold closing rate is lower than the first threshold closing rate. The second threshold road condition is lower than the first threshold road conditions. In other words, method 400 judges whether or not a mid-higher level of road roughness, curviness, slickness, or a mid-high rate of closing to an object is present. If method 400 judges that the road condition is less than the first threshold road condition and greater than the second threshold road condition, or if the vehicle closing is less than the first vehicle threshold closing rate and greater than the second vehicle threshold closing rate, the answer is yes and method 400 proceeds to 445. Otherwise, the answer is no and method 400 proceeds to 448.

At 445, method 400 allows automatic engine output reduction to engine idle conditions via opening the driveline disconnect clutch during low wheel torque request conditions, but automatic stopping of engine rotation is not allowed. For example, at low desired wheel torques, the engine can be decoupled from the DISG, and then the engine speed is reduced to an idle speed. Torque may be provided to the driveline via the DISG. If the wheel torque demand increases, the engine speed is increased to DISG speed, and then the driveline disconnect clutch is closed. In this way, method 400 increases the vehicle's state of readiness during some conditions but allows fuel to be conserved by allowing the engine to idle rather than rotating synchronously with the DISG when the vehicle is in 4×4 operating mode. Method 400 proceeds to 446 after automatic stopping conditions are revised.

At 446, method 400 judges whether or not the engine is presently stopped rotating. The engine may be judged to be stopped rotating when engine rotational speed is zero. If method 400 judges that the engine rotation is stopped, the answer is yes and method 400 proceeds to 447. Otherwise, the answer is no and method 400 proceeds to 448.

At 447, method 400 restarts the engine to ready it for any action the driver may take. The engine may be started via closing the driveline disconnect clutch and supplying spark and fuel to the engine. Method 400 proceeds to 448 after the engine is restarted.

At 448, method 400 judges whether or not closing rate is slower than the second threshold closing rate and faster than a third threshold closing rate, or if a road condition metric (e.g., a slick or rough road condition) is less than the second threshold road condition parameter and greater than a third threshold road condition parameter. The third threshold closing rate is slower (e.g., a longer time period between contact between the vehicle and the object) than the second threshold closing rate. The third threshold road condition parameter is lower than the second threshold road condition parameter. In other words, method 400 judges whether or not a middle level of road roughness, curviness, slickness, or a middle rate of closing to an object is present. If method 400 judges that a road condition metric is less than the second threshold road condition parameter and greater than the third threshold road condition parameter, or if the vehicle closing is slower than the second vehicle threshold closing rate and faster than the third vehicle threshold closing rate, the answer is yes and method 400 proceeds to 449. Otherwise, the answer is no and method 400 proceeds to 460 of FIG. 8.

At 449, method 400 allows automatic engine output reduction to engine idle conditions via opening the driveline disconnect clutch during low wheel torque request conditions, but automatic stopping of engine rotation is not allowed. Thus, the driveline's state of readiness to respond to varying driver wheel torque commands that may be influenced by vehicle and road conditions is higher in four wheel drive mode as compared to when the vehicle is operated in two wheel drive mode. Method 400 proceeds to 460 of FIG. 8 after automatic engine stopping conditions are revised.

Referring now to FIG. 8, it is judged whether or not engine rotation has stopped. If so, the answer is yes and method 400 proceeds to 461. If not, the answer is no and method 400 proceeds to 461.

At 461, the engine is restarted. The engine may be restarted via supplying spark and fuel to the engine and cranking the engine using the DISG or a separate starter. Method 400 proceeds to 462 after the engine is started.

At 462, it is judged whether a closing rate of the vehicle to an object is slower than the third threshold closing rate or if a road condition metric is less than the third threshold road condition parameter. In other words, method 400 judges whether or not a lower level of road roughness, curviness, slickness, or a lower rate of closing to an object is present. If method 400 judges that a road condition metric is less than the third threshold road condition parameter, or if the vehicle closing is slower than the third vehicle threshold closing rate parameter, the answer is yes and method 400 proceeds to 463. Otherwise, the answer is no and method 400 returns to 408 of FIG. 4.

At 463, method 400 allows automatic engine stopping rotation to zero engine speed. The engine speed may be reduced to zero when the vehicle wheel torque demand is low by opening the driveline disconnect clutch and ceasing fuel flow to the engine. If the wheel torque demand increases, the engine may be restarted via the DISG or a starter and the driveline disconnect clutch may be closed so that driveline and wheel torque is increased. The DISG may continue to provide torque to the vehicle driveline to propel the vehicle while decoupled from the engine. Method 400 returns to 408 of FIG. 4 after automatic engine stopping conditions are revised.

Returning now to FIG. 4, it is judged whether or not a request for four wheel drive low (4×4 low) mode is requested at 408. Four wheel drive low mode may be selected by a driver or by a controller. If method 400 judges that four wheel drive low mode is selected, the answer is yes and method 400 proceeds to 466 of FIG. 9. Otherwise, the answer is no and method 400 proceeds to 409.

Figure 9:
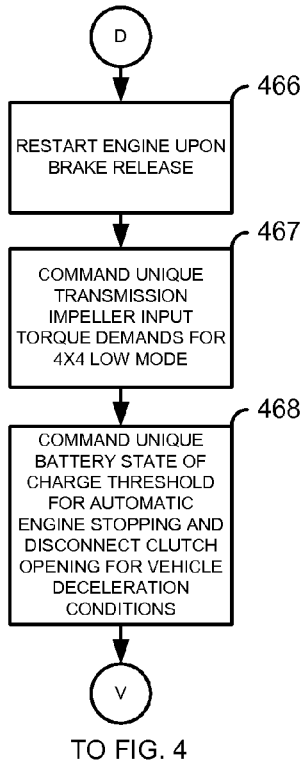
FIG. 9 is a sixth portion of the flowchart for controlling the driveline of the hybrid vehicle.

Referring now to FIG. 9, method 400 adjusts engine starting conditions to include restarting an engine that has stopped rotating upon a driver or controller releasing a brake pedal or actuator. Further, the disconnect clutch is closed so that engine torque is provided to vehicle wheels. Thus, when the driveline is in four wheel drive low range, the engine may be automatically started without a specific request by a driver to restart the engine via a dedicated input that has a sole function of starting and/or stopping the engine. Starting the engine upon brake release allows the drivetrain to increase wheel torque as compared to when only the DISG is providing torque to vehicle wheels. Method 400 proceeds to 467 after engine restarting conditions are adjusted to restart the engine upon release of a brake.

At 467, method 400 commands torque converter input command torque responsive to a schedule that is different than when the vehicle is operated in a four wheel drive high range or a two wheel drive mode. For example, the DISG and engine may contribute different amounts of torque to the torque converter impeller while the vehicle is operated in four wheel drive low range as compared to when the vehicle is operated in two wheel drive or four wheel high range. In particular, during four wheel drive low range, the DISG may provide a higher percentage of wheel torque than the engine when desired wheel torque is less than a threshold torque so that the vehicle may accelerate more smoothly. In contrast, during four wheel drive high range, the engine may provide a higher percentage of wheel torque than the DISG when desired wheel torque is less than the same threshold torque.

Additionally, the engine may be started and stopped automatically without input from a driver operating a dedicated input that has a sole purpose of starting and/or stopping engine rotation at different operating conditions when the vehicle is operated in four wheel drive low mode as compared to when the vehicle is operated in two wheel drive or in four wheel drive high range. For example, the engine may continue to idle for a longer period of time after the vehicle stops moving while in four wheel low mode as compared to when the vehicle is operated in two wheel drive mode or four wheel drive high gear range. Method 400 proceeds to 468 after torque converter input torque scheduling and engine running scheduling are adjusted for four wheel drive low range.

At 468, method 400 commands a unique battery state of charge threshold at which the engine may be automatically stopped while the vehicle is operated in a four wheel drive low range. In one example, the engine may be stopped after battery state of charge has reached a first battery charge threshold while the vehicle is operated in four wheel drive low range. On the other hand, the engine may be stopped after battery state of charge has reached a second battery charge threshold, the second battery charge threshold lower than the first battery charge threshold, when the vehicle is operated in two wheel drive or four wheel drive high range. The engine may be automatically stopped after battery state of charge reaches a higher level while the vehicle is in four wheel drive low range so that the number of times the disconnect clutch is engaged and disengaged may be mitigated to reduce disconnect clutch degradation. When the vehicle is not operated in the four wheel drivel low gear range, engine rotation may be stopped at a lower state of battery charge so that less fuel may be consumed to charge the batteries.

Further, the driveline disconnect clutch may be closed and opened according to a different schedule at 468 as compared to when the vehicle is operated in a four wheel drive low range as compared to when the vehicle is operated in a four wheel drive high range or in a two wheel drive mode. In one example, the driveline disconnect clutch is held in a closed state when the vehicle is operated in a four wheel drive low range while the driveline disconnect clutch may be selectively opened when the vehicle is operated in four wheel drive high range and during two wheel drive. In another example, the driveline disconnect clutch may be opened after the vehicle has been stopped for a first amount of time while the vehicle is operated in four wheel drive low range. In contrast, the driveline disconnect clutch may be opened after the vehicle has been stopped for a second amount of time, the second amount of time less than the first amount of time, while the vehicle is operated in two wheel drive or four wheel drive high range. Method 400 proceeds to 410 of FIG. 4 after disconnect clutch and automatic engine stopping schedules are adjusted for four wheel drive low range.

Returning now to FIG. 4, at 409, method 400 allows the DISG to propel the vehicle without starting the engine upon releasing the vehicle brake. Further, the DISG may propel the vehicle up to a threshold wheel torque demand and/or until battery SOC is reduced to a threshold level. By propelling the vehicle with the DISG and without the engine, it is possible to allow the vehicle to creep at a low speed without a driver input torque demand. The DISG may propel the vehicle up to a threshold wheel torque level and then the engine may be started so that the DISG and engine provide torque to the driveline at higher requested desired wheel torques. In other examples, the DISG and the engine may propel the engine upon releasing the vehicle brake depending on the battery SOC. Method 400 proceeds to 410 after the DISG is allowed to propel the vehicle without the engine after brake pedal release.

At 410, method 400 judges whether or not manual control (e.g., control by the vehicle driver) of the engine, driveline disconnect clutch, and motor are requested. A manual request for control may be made via as display input or via a switch or other known user interface. If method 400 judges that manual control over the engine, driveline disconnect clutch, and motor are requested, the answer is yes and method 400 proceeds to 470 of FIG. 10. Otherwise, the answer is no and method 400 proceeds to 411.

Figure 10:
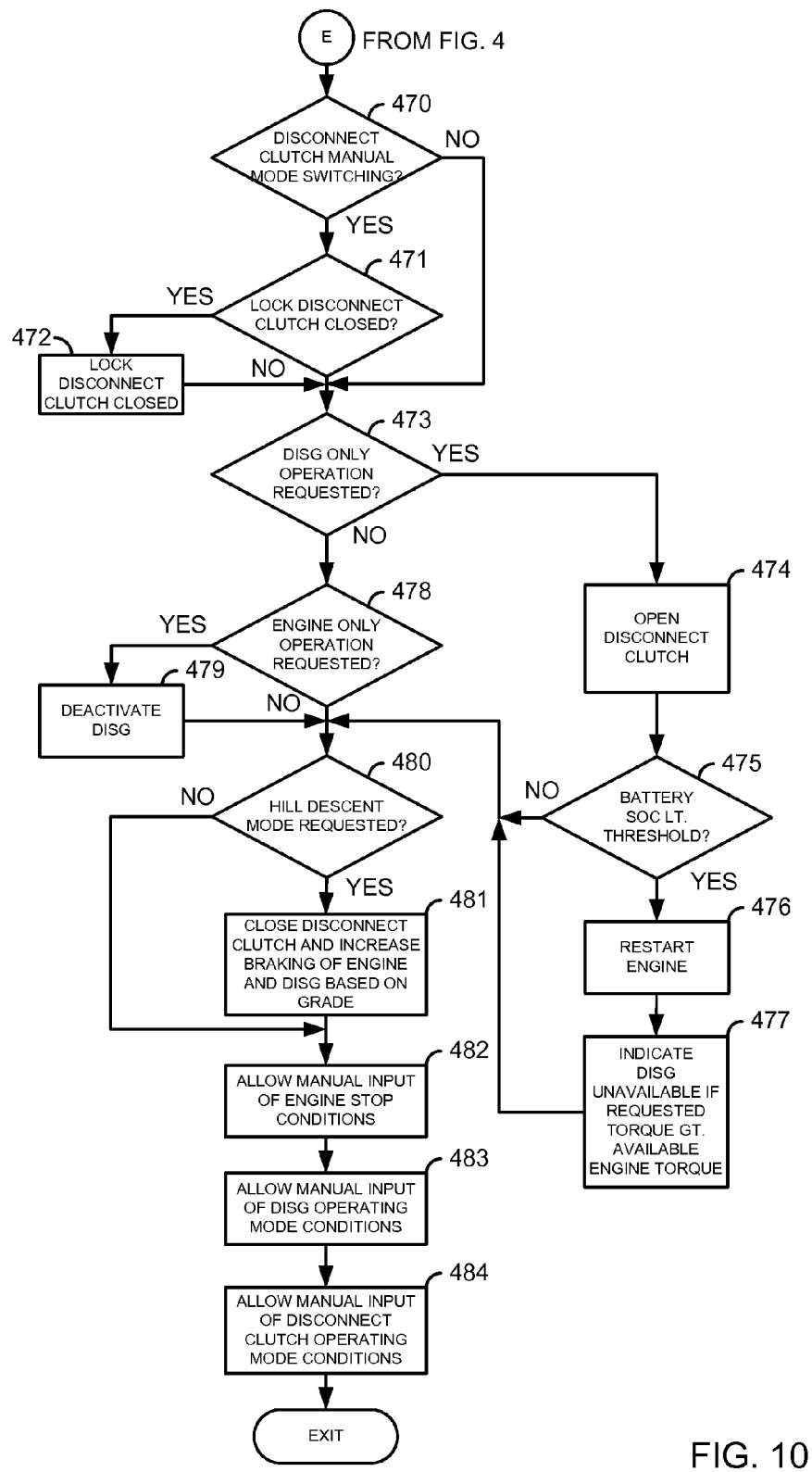
FIG. 10 is a seventh portion of the flowchart for controlling the driveline of the hybrid vehicle.

Turning now to FIG. 10, method 400 judges whether or not manual control over the driveline disconnect clutch is requested at 470. In one example, method 400 may judge that manual control over the disconnect clutch is desired in response to a driver input. If method 400 judges that manual control over the driveline disconnect clutch is requested or desired, the answer is yes and method 400 proceeds to 471. Otherwise, the answer is no and method 400 proceeds to 473.

At 471, method 400 judges whether or not the driver is requesting that the driveline disconnect clutch be locked in a closed position. Method 400 may determine that the driveline disconnect clutch is being requested to be locked in a closed position in response to a user input from the driver. If method 400 judges that it is desired to lock the disconnect clutch in a closed position, the answer is yes and method 400 proceeds to 472. Otherwise, the answer is no and method 400 proceeds to 473. If method 400 proceeds to 400 the driveline disconnect clutch is operated automatically and not in response to a specific driver request to open or close the driveline disconnect clutch.

At 472, method 400 closes the driveline disconnect clutch and leaves it lock in a closed state until the driver releases manual control over the driveline disconnect clutch. Closing the driveline disconnect clutch mechanically couples the engine to the DISG, but the DISG and/or engine may be deactivated when the driveline disconnect clutch is closed. Method 400 proceeds to 473 after the driveline disconnect clutch is closed.

At 473, method 400 judges whether or not DISG only operation is requested. In DISG only operating mode the engine is deactivated by stopping fuel flow to the engine. The engine throttle may also be closed and cam timing/lift is adjusted to a lower volumetric efficiency when the engine is deactivated to increase pumping losses and to reduce air flow through the engine. Alternatively, the throttle may be opened and the cam timing/lift adjusted to a higher volumetric efficiency to reduce engine pumping losses. DISG only operation may be manually selected by the driver. If DISG only mode is requested the answer is yes and method 400 proceeds to 474. Otherwise, the answer is no and method 400 proceeds to 478.

At 474, method 400 opens the driveline disconnect clutch to reduce rotational losses, thereby increasing the amount of energy that is available to propel the vehicle. If the driveline disconnect clutch has been manually closed, entry into DISG only mode may be inhibited. Method 400 proceeds to 475 after the driveline disconnect clutch has been opened.

At 475, method 400 judges whether or not battery SOC is less than a threshold SOC. In one example, the threshold SOC is at a level that allows the engine to be restarted via the DISG or another starter. The battery SOC may be determined from battery voltage. If method 400 judges that battery SOC is less than a threshold SOC, the answer is yes and method 400 proceeds to 476. Otherwise, the answer is no and method 400 proceeds to 480.

At 476, method 400 restarts the engine. The engine is restarted so that the DISG may change modes from providing positive torque to the driveline to absorbing torque from the driveline and producing electrical energy to recharge the batteries. In other examples, the DISG may simply be shutdown without starting the engine after the operator is provided an indication of an impending DISG shutdown. Method 400 proceeds to 477 after the engine is restarted.

At 477, method 400 changes the DISG mode to a mode where electrical energy is provided to batteries from the DISG. However, if the engine lacks torque to provide a torque requested by the driver, an indication that the DISG is unavailable is provided to the driver. Otherwise, the engine provides torque based in the driver torque request and battery charging via the DISG. Method 400 proceeds to 480 after the DISG mode is changed.

At 478, method 400 judges whether or not engine only mode is manually requested by the driver. In engine only mode the driveline disconnect clutch is closed and the DISG is not providing positive torque to the driveline. However, in some examples, the DISG may be providing a negative torque to the driveline to recharge batteries and provide electrical power to the vehicle's electric network. If engine only mode is manually requested by the driver, the answer is yes and method 400 proceeds to 479. Otherwise, the answer is no and method 400 proceeds to 480.

At 479, method 400 deactivates the DISG from providing positive torque to the driveline. However, in some examples, the DISG may convert rotational energy from the engine into electrical energy to charge vehicle batteries and provide electrical power to the vehicle's electric network. Method 400 proceeds to 480 after the DISG is deactivated.

At 480, method 400 judges whether or not a request to enter a hill decent mode has been requested. In some examples, a hill assent mode may be provided in place of or in addition to the hill descent mode at 480. In a hill descent mode the engine and DISG may provide a higher level of vehicle braking than when the vehicle is not in a hill descent mode. A request to enter a hill descent mode may be manually be input by the driver. Alternatively, hill descent mode may be entered when the vehicle inclinometer indicates a negative driving surface grade that is steeper than a threshold negative grade. If a request for hill descent mode is requested, the answer is yes and method 400 proceeds to 481. Otherwise, the answer is no and method 400 proceeds to 482. In examples including a hill assent mode, the driveline disconnect clutch is operated in a similar manner.

At 481, method 400 closes the disconnect clutch to mechanically couple the engine to the DISG and vehicle braking is increased via increased engine braking and DISG braking. In one example, engine braking is increased by adjusting engine valve timing. DISG braking is increase by allowing more field current to be supplied to the DISG. In one example, the rate of DISG braking and engine braking is adjusted responsive to the driving surface grade. For example, if the road surface is deemed more slick than a threshold, the rate of DISG and engine braking may be reduced. Method 400 proceeds to 482 after DISG and engine braking are adjusted.

At 482, method 400 allows the driver to manually input engine stop conditions. Additionally, method 400 stops the engine responsive to the manually input stop conditions. For example, the driver may input a period of time after the vehicle reaches zero speed before engine rotation may be automatically stopped. In another example, the driver may specify a threshold battery SOC where engine rotation may be automatically stopped. In still another example, the driver may specify that the engine is not stopped when the ascending or descending grade is steeper than a specified value. Method 400 proceeds to 483 after the driver is allowed to manually input engine stopping conditions and after the engine stopping conditions are implemented.

At 483, method 400 allows the driver to manually input DISG operating mode conditions. Further, method 400 operates the DISG responsive to the manually input conditions. For example, the driver may input a wheel torque demand level below which the DISG is operated without supplying fuel to the engine. In another example, the driver may specify a threshold torque above which the DISG assists the engine to provide the desired wheel torque. In still another example, the driver may specify that the DISG is to being providing electrical energy to the batteries when the battery SOC is less than a driver input level. Method 400 proceeds to 484 after the driver is allowed to manually input DISG operating conditions.

At 484, method 400 allows the driver to manually input driveline disconnect clutch opening and closing conditions. For example, the driver may input a condition that the driveline disconnect clutch be closed in response to a particular driveline mode (e.g., hold disconnect clutch closed in 4×4 low mode and selectively closed disconnect clutch in 4×2 and 4×4 high modes). In another example, the driver may input a condition that the driveline disconnect clutch be opened in response to an engine idle time duration. In still another example, the driver may specify driveline disconnect clutch to be closed when battery SOC is less than a driver specified value. Method 400 exits after the driver is allowed to manually input engine, driveline disconnect clutch, and motor control conditions.

Returning now to FIG. 4, method 400 operates the engine, driveline disconnect clutch, and DISG according to adjusted base automated conditions. Specifically, base calibrated engine, driveline disconnect clutch, and DISG operating conditions are the basis for operating the engine, driveline disconnect clutch, and DISG except where specific driver changes in the above sections of method 400 have been input. For example, if the driver requested PTO operation and that the DISG is operated until battery SOC reaches a driver specified level, the engine, driveline disconnect clutch, and DISG are operated according to base calibrated conditions except when the vehicle is in a PTO mode using the DISG. Method 400 exits after the engine, driveline disconnect clutch, and DISG are operated according to adjusted base operating mode conditions.

Thus, the method of FIGS. 4-10 provides for A method of operating a PTO, comprising: rotating a PTO output via rotating a PTO power source in a first direction; and reversing rotation of the PTO output via rotating the PTO power source in a second direction different than the first direction, the PTO power source positioned in a vehicle driveline. The method includes where the PTO power source is positioned between an engine and a torque converter. The method includes where the PTO power source is a DISG. The method includes where the PTO power source is also positioned between a driveline disconnect clutch and the torque converter.

In some examples, the method further comprises ceasing output of the DISG in response to a PTO operated device being at a travel limit. The method includes where the driveline disconnect clutch is in an open state while rotating the PTO output. The method also includes where the vehicle is operated in a stationary PTO mode where the vehicle does not move. The method further comprises providing an indication of an impending PTO shutdown in response to a battery SOC. Additionally, the method further comprises ceasing to provide power to the PTO output via the PTO power source after providing the indication of the impending PTO shutdown.

In another example, the method of FIGS. 4-10 provide for operating a PTO, comprising: rotating a PTO output via rotating a first PTO power source and a second PTO power source, the first PTO power source and the second PTO power source providing positive torque to a vehicle driveline; and varying output of the first PTO power source and the second PTO power source in response to available output of the second PTO power source. The method includes where the first PTO power source is an engine, and where the second PTO power source is a DISG. The method includes where a driveline disconnect clutch positioned in a driveline between the first PTO power source and the second PTO power source is in a closed state. In some examples, the method further comprises adjusting output of the first PTO power source in response to a wheel torque that is less than a desired wheel torque. The method further comprises adjusting output of the second PTO power source in response to a wheel torque that is less than a desired wheel torque.

In still another example, the method of FIGS. 4-10 provides for operating a PTO, comprising: operating the PTO in a stationary vehicle, the PTO operated in a stationary mode; rotating a PTO output via rotating a first PTO power source in a first direction and a second direction; and rotating the PTO output via a positive torque provided by the first PTO power source and a positive torque provided by the second PTO power source. The method further comprises opening a driveline disconnect clutch when rotating the PTO in the second direction and opening or closing the driveline disconnect clutch when rotating the PTO in the first direction. In some examples, the method further comprises ceasing to operate the first PTO power source in response to a battery SOC. The method further comprises adjusting a speed of the PTO output via adjusting the positive torque provided by the first PTO power source. The method further comprises adjusting a speed of the PTO output via adjusting the positive torque provided by the second PTO power source. The method also includes where the first PTO power source is a DISG, and where the second PTO power source is an engine, and where the DISG is positioned in a driveline between a transmission and the engine.

Referring now to FIG. 11, a prophetic example sequence for operating a vehicle that includes a PTO is shown. The sequence of FIG. 11 may be provided by the method of FIG. 4 executed in the system of FIGS. 1-3. FIG. 11 shows an example of PTO operation where the DISG solely supplies torque to the PTO. However, in some examples, the engine may also supply PTO torque.

The first plot from the top of FIG. 11 shows a PTO request versus time. The X axis represents time and the Y axis indicates PTO operational request state. A lower level PTO signal indicates an absence of a PTO operating request. A higher level PTO signal indicates presence of a PTO operating request. Time increases from the left side of the plot to the right side of the plot.

The second plot from the top of FIG. 11 shows battery state of charge versus time. The X axis represents time and the Y axis indicates battery stat of charge. Battery state of charge increases in the direction of the Y axis arrow. Time increases from the left side of the plot to the right side of the plot. Horizontal line 1101 represents a minimum battery SOC where the DISG is operated.

The third plot from the top of FIG. 11 shows a PTO direction request versus time. The X axis represents time and the Y axis indicates PTO direction request state. A lower level PTO direction request signal indicates to rotate the PTO in a forward direction (e.g., rotate to the right). A higher level PTO direction request signal indicates to rotate the PTO in a reverse direction (e.g., rotate the PTO to the left). Time increases from the left side of the plot to the right side of the plot.

The fourth plot from the top of FIG. 11 shows PTO rotation direction versus time. The X axis represents time and the Y axis indicates PTO direction. A lower level PTO direction signal indicates PTO rotation in a forward direction (e.g., rotate to the right). A higher level PTO direction signal indicates PTO rotation in a reverse direction (e.g., rotate the PTO to the left). Time increases from the left side of the plot to the right side of the plot.

The fifth plot from the top of FIG. 11 shows PTO torque versus time. The X axis represents time and the Y axis indicates PTO output torque. PTO positive output torque increases in the direction of the Y axis arrow. Time increases from the left side of the plot to the right side of the plot. In this example, PTO output torque is always shown as positive, independent of PTO rotation direction, since the PTO is supplying torque to an external device.

The sixth plot from the top of FIG. 11 shows DISG torque versus time. The X axis represents time and the Y axis indicates DISG output torque. DISG positive output torque increases in the direction of the Y axis arrow. Time increases from the left side of the plot to the right side of the plot. In this example, DISG output torque is always shown as positive, independent of PTO rotation direction, since the DISG is supplying torque to an external device via the PTO.

At time $T_0$, the PTO request is at a low level indicating the absence of a PTO request and PTO output. The battery state of charge is at a relatively high level indicating that the PTO may operate for some period of time solely under battery power. The PTO direction request signal indicates that the PTO is to operate in a forward direction when the PTO is engaged. The PTO direction also indicates that the PTO will rotate in a forward direction if engaged. The PTO output torque at zero since the PTO is not engaged and the DISG torque is also shown at zero.

At time $T_1$, the PTO request signal transitions to a higher level to indicate that the PTO should be engaged in response to a driver or controller request. The PTO request signal may transition in response to an operator input or a controller request for PTO output. The battery state of charge begins to slowly be reduced as the DISG output increases, thereby increasing the PTO torque. The PTO direction request remains in a forward direction and the PTO rotates in a forward direction as indicated by the PTO direction plot.

At time $T_2$, the PTO direction request transitions from forward to reverse in response to a driver or controller request. The PTO direction changes from forward to reverse shortly after the DISG and PTO torque are reduced so as to accommodate the change in PTO direction. The PTO and DISG torque is reduced to avoid producing a torque disturbance to the driveline. The battery state of charge continues to be reduced as DISG operation continues.

At time $T_3$, the PTO request is still asserted, but the battery SOC is reduced to the minimum state of charge 1101 where DISG operation is permitted. Consequently, the DISG output torque and PTO torque are reduced in response to the battery SOC. The PTO direction and PTO direction request remain in a reverse state. By ramping off the DISG, battery degradation may be avoided.

In this way, a driveline including a DISG and PTO may be operated to provide direction control. Further, PTO operation may be limited so as to reduce the possibility of battery and/or DISG degradation.

Referring now to FIG. 12, a prophetic example sequence for operating a vehicle that includes a 4×4 low gear range mode is shown. The sequence of FIG. 12 may be provided by the method of FIG. 4 executed in the system of FIGS. 1-3.

The first plot from the top of FIG. 12 shows a 4×4 low gear range request versus time. The X axis represents time and the Y axis indicates 4×4 low gear range request state. A lower level 4×4 low gear range signal indicates an absence of a 4×4 low gear range operating request. A higher level 4×4 low gear range signal indicates presence of a 4×4 low gear range operating request. Time increases from the left side of the plot to the right side of the plot.

The second plot from the top of FIG. 12 shows desired wheel torque versus time. The X axis represents time and the Y axis represents desired wheel torque. Desired wheel torque increases in the direction of the Y axis arrow. Time increases from the left side of the plot to the right side of the plot.

The third plot from the top of FIG. 12 shows engine operating state versus time. The X axis represents time and the Y axis indicates engine operating state. A lower level engine operating state signal indicates that the engine has stopped rotating. A higher level engine operating state signal indicates that the engine is rotating under its own power. Time increases from the left side of the plot to the right side of the plot.

The fourth plot from the top of FIG. 12 shows vehicle brake pedal state versus time. The X axis represents time and the Y axis indicates brake pedal state. A lower level brake pedal signal indicates that the brake pedal is not applied or is released. A higher level brake pedal signal indicates that the brake pedal is applied. Time increases from the left side of the plot to the right side of the plot.

The fifth plot from the top of FIG. 12 shows engine torque versus time. The X axis represents time and the Y axis indicates engine output torque. Engine positive output torque increases in the direction of the Y axis arrow. Time increases from the left side of the plot to the right side of the plot.

The sixth plot from the top of FIG. 12 shows DISG torque versus time. The X axis represents time and the Y axis indicates DISG output torque. DISG positive output torque increases in the direction of the Y axis arrow. Time increases from the left side of the plot to the right side of the plot.

At time $T_0$, the 4×4 low gear range request is at a low level indicating the absence of a 4×4 low gear range request. Desired wheel torque is at a middle level and the engine is rotating under its own power. The brake is not applied and the DISG and engine are both providing torque to the vehicle driveline.

At time $T_1$, the desired wheel torque is reduced in response to a driver releasing an accelerator pedal. Further, the vehicle brake pedal is applied by the driver and the engine and DISG torque are reduced in response to the reduced desired wheel torque. The engine continues to operate and 4×4 low gear range has not been requested.

At time $T_2$, the desired wheel torque reaches zero and the engine is automatically stopped shortly thereafter without the driver requesting engine stop via a dedicated input having the sole function of starting and/or stopping the engine. The engine state signal transitions to a low level to indicate that the engine has been stopped. The engine torque and the DISG torque are at a level of zero so that the vehicle is not propelled. The vehicle brake remains in an applied state.

At time $T_3$, the 4×4 low gear range is requested as indicated by the 4×4 low gear range signal transitioning to a higher level. The 4×4 low gear range signal may be asserted in response to a driver's request to enter 4×4 low gear range. The driveline disconnect clutch (not shown) is also closed at time $T_3$ in response to entering the 4×4 low gear range.

At time $T_4$, the vehicle brake state transitions to a lower level in response to a driver releasing a brake pedal. Since the vehicle is in a 4×4 low gear range, the engine is started automatically without driver input to a device that has a sole function of starting and/or stopping the engine (e.g., a starter switch) in response to the brake pedal release. Shortly thereafter, the desired wheel torque increases in response to a driver depressing an accelerator pedal. The engine torque and the DISG torque also increase in response to the increasing desired wheel torque to provide the desired wheel torque. Thus, the engine is automatically started in response to brake pedal release when the vehicle is in 4×4 low gear range. Such operation allows the vehicle driveline to receive a higher level of torque. The driveline disconnect clutch remains engaged during the engine stop and restart periods.

Between times $T_4$ and $T_5$, engine torque and DISG torque are increased to provide the desired wheel torque in response to a driver or controller request. Further the brake pedal remains in an inactivated state until the brake pedal is applied at time $T_5$ as indicated by the brake pedal state transitioning to a higher level. The desired wheel torque signal is also reduced at time $T_5$ in response to the driver releasing the accelerator pedal. Further, the engine torque and DISG torque are reduced in response to the reduced desired wheel torque at time $T_5$. The vehicle remains in 4×4 low gear range. The engine is shutdown and stops rotating shortly before time $T_6$. The amount of time it takes between when the desired wheel torque reaches zero, when the engine torque is reduced to idle the engine, and DISG torque reaches zero to the time when the engine is stopped increases since the vehicle is in the 4×4 low gear range as compared to when the vehicle is in the 4×2 mode at time $T_2$. This additional delay time is useful for allowing a pause time between driving over rough driving surfaces without prematurely stopping the engine.

At time $T_6$, the vehicle exits 4×4 low gear range and transitions to 4×2 wheel or 4×4 high gear range in response to a driver demand. The brake pedal continues to be applied as indicated by the brake state signal remaining at a higher level. The engine torque and DISG torque remain at low levels.

At time $T_7$, the desired wheel torque is increased in response to a driver or controller request. Since the vehicle is now not in 4×4 low gear range, the engine remains stopped and DISG output torque is increased to meet the desired wheel torque. Thus, the DISG supplies torque to the driveline, including creep torque to slowly propel the vehicle without a driver wheel torque demand, up to a threshold torque so that fuel may be conserved. The vehicle brake is also released by the driver as indicated by the brake state transitioning to a lower level.

At time $T_8$, the desired wheel torque is increased to a level where the engine is restarted in response to the desired wheel torque requested by a driver or a controller. Engine torque is supplied to the driveline to meet the desired wheel torque after the engine is started as indicated by the engine state signal transitioning to a higher level. Thus, the engine and DISG both supply torque to meet the desired wheel torque at time $T_8$.

In this way, a driveline including a DISG and engine may be operated differently when the vehicle is operated in 4×4 low gear range as compared to when the vehicle is operated in a different driveline mode. Such operation may reduce driveline component degradation by limiting the number of transitions between applying and releasing the driveline disconnect clutch.

Referring now to FIG. 13, a prophetic example sequence for operating a vehicle between 4×2 and 4×4 modes is shown. The sequence of FIG. 13 may be provided by the method of FIG. 4 executed in the system of FIGS. 1-3.

The first plot from the top of FIG. 13 shows a plot of available engine modes versus time. The X axis represents time and the Y axis indicates available engine mode. When the available engine mode is at a value of one, the engine may be operated only with the engine coupled to the DISG. Further, when the available engine mode is a value of one, the engine remains rotating. When the available engine mode is at a value of two, the driveline disconnect clutch may be in an open or closed state. The engine remains rotating when the engine mode is a value of two, and the engine may be at idle when the driveline disconnect clutch is open. When the available engine mode is a value of three, engine rotation may continue at idle, off-idle, or be stopped to conserve fuel. The available engine modes change in response to the road condition metric described in the second plot. Time increases from the left side of the plot to the right side of the plot.

The second plot from the top of FIG. 13 shows a road condition metric or value versus time. The X axis represents time and the Y axis represents road condition metric. The road condition metric value increases in the direction of the Y axis arrow. Time increases from the left side of the plot to the right side of the plot. Horizontal lines 1301, 1302, 1303, and 1304 represent different threshold levels of the road condition metric where the available driveline mode changes. The road condition metric indicated by line 1301 represents a higher value road condition metric where the road may be very slick, very curvy, or very rough. The road condition metric indicated by line 1302 represents a middle higher value road condition metric where the road may be slick, very curvy, or rough. The road condition metric indicated by line 1303 represents a middle lower value road condition metric where the road may be somewhat slick, very curvy, or rough. The road condition metric indicated by line 1304 represents a lower value road condition metric where the road is not very slick, very curvy, or very rough.

The third plot from the top of FIG. 13 shows engine operating state versus time. The X axis represents time and the Y axis indicates engine operating state. When the engine state is at a value of one, engine rotation is stopped. When the engine state is at a value of two, the engine operates at idle when the driveline disconnect clutch is open. Further, when the driveline disconnect clutch is closed and the engine state is a value of two, the engine may operate at idle or off-idle (e.g., at higher engine speeds). When the engine state is at a value of three, the engine may operate at idle or off-idle when the driveline disconnect clutch is closed. Time increases from the left side of the plot to the right side of the plot.

The fourth plot from the top of FIG. 13 shows driveline mode versus time. The X axis represents time and the Y axis indicates driveline mode. A lower level driveline mode signal indicates that the driveline is in 4×2 mode. A higher level driveline mode signal indicates that the driveline is in 4×4 mode. Time increases from the left side of the plot to the right side of the plot.

The fifth plot from the top of FIG. 13 shows driveline disconnect clutch state versus time. The X axis represents time and the Y axis indicates driveline disconnect clutch state. A higher level driveline disconnect clutch state indicates that the disconnect clutch is closed and the engine is mechanically coupled to the DISG. A lower level driveline disconnect clutch state indicates that the disconnect clutch is open and the engine is not mechanically coupled to the DISG. Time increases from the left side of the plot to the right side of the plot.

The sixth plot from the top of FIG. 13 shows wheel torque demand versus time. The X axis represents time and the Y axis indicates desired wheel torque. Desired wheel torque increases in the direction of the Y axis arrow. Time increases from the left side of the plot to the right side of the plot.

At time $T_0$, the available engine mode is at a value of three and indicates that the engine may be stopped, operated at idle, or operated off idle. Additionally, the road condition metric is at a level below the lower threshold 1304 and the driveline is in 4×2 mode as indicated by the driveline mode signal being at a lower state. The engine state value is at three and indicates that the engine may be operate at idle, off-idle, or may stop since road condition metric is less than the level indicated by horizontal line 1304.

At time $T_1$, the road condition metric has increased to a value that is greater than the level indicated by lines 1304. The road condition metric level indicated by line 1304 is a level while in 4×2 mode, the available engine mode changes in response to the road condition metric value. The road condition metric is changed in response to road or surface conditions on which the vehicle is operating. The available engine mode signal changes to a value of two in response to the change in the road condition metric. In particular, the available engine modes are changed such that the engine may be operated at idle or off-idle with the driveline disconnect clutch open, but the engine may not be automatically stopped. The disconnect clutch remains closed and the wheel torque demand remains relatively constant. Further, the driveline mode remains in 4×2 mode.

At time $T_2$, the road condition metric has increased to a value that is greater than the level indicated by line 1301. The available engine mode signal changes to a value of one in response to the change in the road condition metric. Specifically, the available engine modes are changed such that the engine may not be operated at idle with the disconnect clutch open and rotation of the engine may not be automatically stopped. The disconnect clutch remains closed and the wheel torque demand remains relatively constant. Further, the driveline mode remains in 4×2 mode.

Between time $T_2$ and time $T_3$, the driveline mode is changed from 4×2 to 4×4 and the wheel torque is varied in response to driver demand. The road condition metric increases to a value above horizontal line 1301. As a result, the available engine mode remains at a value of one to ensure that the driveline may be ready to respond to driver input during degraded driving conditions. The engine state stays at a value of three, and the driveline disconnect remains closed.

At time $T_3$, the road condition metric is reduced to a value less than that of horizontal line 1301 in response to road conditions. The lower road condition metric indicates improving driving conditions. The available engine mode changes to a value of two in response to the decreasing road condition metric. Further, the wheel torque is relatively low so that the driveline disconnect clutch may be opened as shown. The engine moves to idle as indicated by the engine state changing to a value of one. The driveline mode remains in 4×4 mode. In this way, engine fuel consumption may be reduced by operating the engine at idle with the driveline disconnect clutch held open. However, the engine may not be automatically stopped when the available engine mode is at a value of two.

At time $T_4$, the road condition metric is reduced to a level below horizontal line 1304 in response to road conditions. Consequently, the available engine mode is changed to a value of three to allow the engine to stop. The disconnect clutch remains in an open state and the driveline mode remains in 4×4 mode. Between time $T_4$ and time $T_5$, the wheel torque increases and decreases in response to a drive demand and the driveline disconnect clutch is closed to provide the desired wheel torque via a combination of engine and DISG torque. The driveline disconnect clutch is closed when the wheel torque exceeds a threshold level shortly before time $T_5$. The engine state changes from stopped to where the engine may idle when the disconnect clutch is open. However, since the disconnect clutch is closed, the engine may be operated at higher speeds.

At time $T_5$, the road condition metric increases to a value indicated by horizontal line 1304 in response to road conditions. The available engine mode changes to a value of two to indicate that the engine may be operated at idle and off-idle but may not be automatically stopped. It may be observed that the available engine modes changes at different levels of the road condition metric when the vehicle is operated in 4×4 mode as compared to when the vehicle is operated in 4×2 mode. Such operation may reduce degradation of driveline components when the vehicle is operated in 4×4 mode. The engine state remains at a value of two indicating that the engine may go to idle if the disconnect clutch is opened.

At time $T_6$, the road condition metric value increases to a level greater than that of horizontal line 1301. The available engine modes changes to a value of three indicating that the engine may not be automatically stopped. The engine state is also changes to a level of three to indicate that the engine may operate at idle or off-idle when the disconnect clutch is closed. The engine state and available engine mode stay at the same levels until the end of the sequence.

As will be appreciated by one of ordinary skill in the art, methods described in FIGS. 4-10 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method of operating a vehicle, comprising:
while the vehicle is stationary and parked, operating a power take off (PTO), including rotating a PTO output via rotating a first PTO power source in a first direction and a second direction; and rotating the PTO output via a positive torque provided by the first PTO power source and a positive torque provided by a second PTO power source.

2. The method of claim 1, further comprising opening a driveline disconnect clutch when rotating the PTO in the second direction.

3. The method of claim 1, further comprising opening or closing a driveline disconnect clutch when rotating the PTO in the first direction.

4. The method of claim 3, where the first PTO power source is a driveline integrated starter/generator (DISG), and where the second PTO power source is an engine, and where the DISG is positioned in a driveline between a transmission and the engine.

5. The method of claim 1, further comprising ceasing to operate the first PTO power source in response to a battery state of charge (SOC) less than a threshold.

6. The method of claim 1, further comprising adjusting a speed of the PTO output via adjusting the positive torque provided by the first PTO power source.

7. The method of claim 1, further comprising adjusting a speed of the PTO output via adjusting the positive torque provided by the second PTO power source.

8. A method of operating a power take off (PTO) of a vehicle, comprising:
rotating a mechanical device external the vehicle and other than vehicle wheels via a PTO output by way of rotating a first PTO power source including an engine and a second PTO power source, the first PTO power source and the second PTO power source providing positive torque to a vehicle driveline;
varying output of the first PTO power source and the second PTO power source in response to available output of the second PTO power source; and
selectively shutting down the engine during stopped vehicle conditions.

9. The method of claim 8, where the second PTO power source is a driveline integrated starter/generator (DISG).

10. The method of claim 8, where a driveline disconnect clutch positioned in a driveline between the first PTO power source and the second PTO power source is in a closed state.

11. The method of claim 8, further comprising adjusting output of the first PTO power source in response to a wheel torque that is less than a desired wheel torque.

12. The method of claim 8, further comprising adjusting output of the second PTO power source in response to a wheel torque that is less than a desired wheel torque.

13. A method for a vehicle, comprising:
rotating a device external the vehicle and different than vehicle wheels via rotating a power take off (PTO) output by way of rotating an electric machine in a first direction;
reversing rotation of the PTO output via rotating the electric machine in a second direction different than the first direction, the electric machine positioned in a vehicle driveline; and
selecting shutting down the engine during stopped vehicle conditions.

14. The method of claim 13, where the electric machine is positioned between an engine and a torque converter.

15. The method of claim 14, where the electric machine is a driveline integrated starter generator (DISG).

16. The method of claim 15, where the electric machine is also positioned between a driveline disconnect clutch and the torque converter.

17. The method of claim 16, further comprising ceasing output of the DISG in response to a PTO operated device being at a travel limit.

18. The method of claim 16, where the driveline disconnect clutch is in an open state while rotating the PTO output.

19. The method of claim 13, where the vehicle including the vehicle driveline is operated in a stationary PTO mode where the vehicle does not move.

20. The method of claim 13, further comprising providing an indication of an impending PTO shutdown in response to a battery state of charge (SOC) and ceasing to provide power to the PTO output via a PTO power source after providing the indication of the impending PTO shutdown.

\* \* \* \* \*